(12) United States Patent
Waldl et al.

(10) Patent No.: US 12,123,402 B2
(45) Date of Patent: Oct. 22, 2024

(54) METHOD FOR CHANGING A SLIDING BEARING PAD ARRANGED ON A ROTOR SHAFT OF A ROTOR BEARING OF A WIND TURBINE

(71) Applicant: Miba Gleitlager Austria GmbH, Laakirchen (AT)

(72) Inventors: Albert Waldl, Laakirchen (AT); Alexander Loitesberger, Ohlsdorf (AT); Patrick Laubichler, Gmunden (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 0 days.

(21) Appl. No.: 18/038,913

(22) PCT Filed: Aug. 30, 2021

(86) PCT No.: PCT/AT2021/060300
§ 371 (c)(1),
(2) Date: May 25, 2023

(87) PCT Pub. No.: WO2022/109634
PCT Pub. Date: Jun. 2, 2022

(65) Prior Publication Data
US 2024/0018943 A1    Jan. 18, 2024

(30) Foreign Application Priority Data

Nov. 30, 2020   (AT) .............................. A 51044/2020
Apr. 8, 2021   (AT) .............................. A 50259/2021
Apr. 8, 2021   (AT) .............................. A 50260/2021

(51) Int. Cl.
*B23P 6/00*       (2006.01)
*F03D 80/50*      (2016.01)
(Continued)

(52) U.S. Cl.
CPC ............. *F03D 80/50* (2016.05); *F03D 80/70* (2016.05); *F16C 43/02* (2013.01);
(Continued)

(58) Field of Classification Search
CPC combination set(s) only.
See application file for complete search history.

(56) References Cited

U.S. PATENT DOCUMENTS 8,450,871 B2    5/2013   Trede
9,458,880 B2   10/2016   Kari et al.
(Continued)

FOREIGN PATENT DOCUMENTS

DE    10 2016 112 292 A1      1/2018
DE       102019131245 A1 *   5/2021    ............. F03D 80/70
(Continued)

OTHER PUBLICATIONS

English translation of DE-102020108248-B3 (Year: 2021).*
(Continued)

*Primary Examiner* — Jun S Yoo
(74) *Attorney, Agent, or Firm* — Collard & Roe, P.C.

(57) ABSTRACT

A method for changing slide bearing pads arranged on a rotor shaft of a rotor bearing arrangement of a wind turbine, includes the method steps: moving the slide bearing pad to be changed to a removal opening by rotating the rotor shaft; releasing an axial securing element of the slide bearing pad to be changed; axially removing the slide bearing pad to be changed through the removal opening; axially inserting a new slide bearing pad through the removal opening; and fixing the new slide bearing pad by the axial securing element. A slide bearing pad changing device with a manipulation arm that is movable relative to a base frame is used for axially removing the slide bearing pad to be changed and for axially inserting a new slide bearing pad, wherein the
(Continued)

Figure 1:
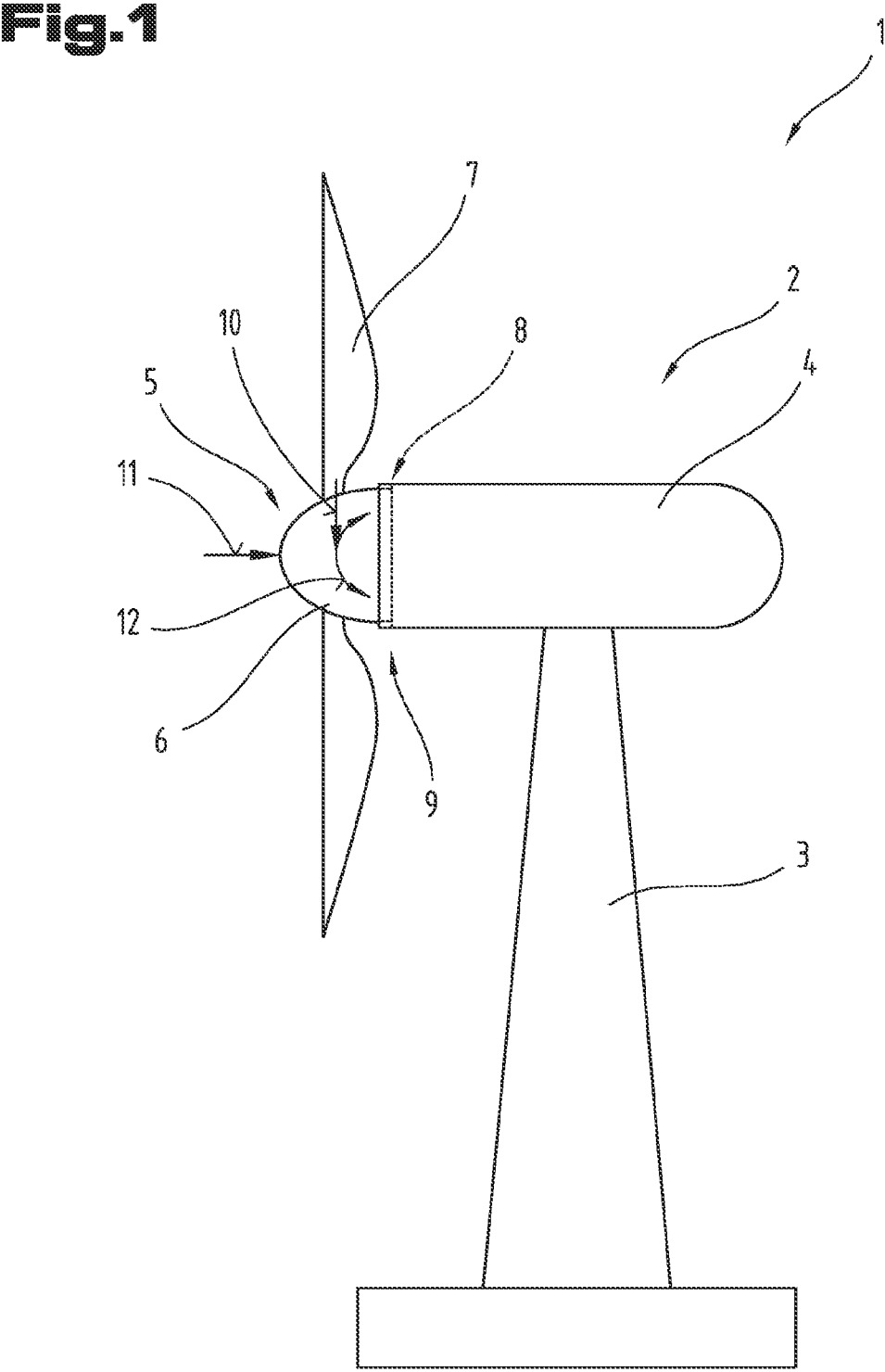

manipulation arm is configured for coupling with the slide bearing pad.

6 Claims, 21 Drawing Sheets

(51) Int. Cl.
 *F03D 80/70* (2016.01)
 *F16C 43/02* (2006.01)
(52) U.S. Cl.
 CPC ....... *F05B 2240/50* (2013.01); *F16C 2237/00* (2013.01); *F16C 2360/31* (2013.01)

(56) References Cited

U.S. PATENT DOCUMENTS

| | | | |
|---|---|---|---|
| 10,647,365 | B2 | 5/2020 | Beitzen-Heineke et al. |
| 11,486,446 | B2 | 11/2022 | Hoelzl et al. |
| 2019/0085827 | A1* | 3/2019 | Frydendal ............... F16C 39/02 |
| 2019/0368544 | A1 | 12/2019 | Julliand et al. |
| 2022/0145862 | A1 | 5/2022 | Holzinger et al. |

FOREIGN PATENT DOCUMENTS

| | | | | |
|---|---|---|---|---|
| DE | 102020108248 | B3 * | 9/2021 | ............. F03D 80/50 |
| EP | 0 123 221 | A1 | 10/1984 | |
| EP | 2 116 722 | A2 | 11/2009 | |
| EP | 2 472 103 | A2 | 7/2012 | |
| EP | 2 949 921 | A1 | 12/2015 | |
| EP | 3 260 715 | A1 | 12/2017 | |
| EP | 3 431 752 | A1 | 1/2019 | |
| EP | 3 460 272 | A1 | 3/2019 | |
| JP | H04-46779 | A | 2/1992 | |
| KR | 10-1236763 | B1 | 2/2013 | |
| KR | 10-2014-0134799 | A | 11/2014 | |
| WO | 2011/127510 | A1 | 10/2011 | |
| WO | 2020/176918 | A1 | 9/2020 | |
| WO | 2020/176919 | A1 | 9/2020 | |

OTHER PUBLICATIONS

English translation of DE-102019131245-A1 (Year: 2021).*
International Search Report in PCT/AT2021/060300, mailed Nov. 26, 2021.

* cited by examiner

METHOD FOR CHANGING A SLIDING BEARING PAD ARRANGED ON A ROTOR SHAFT OF A ROTOR BEARING OF A WIND TURBINE

CROSS REFERENCE TO RELATED APPLICATIONS

This application is the National Stage of PCT/AT2021/060300 filed on Aug. 30, 2021, which claims priority under 35 U.S.C. § 119 of Austrian Application No. A51044/2020 filed on Nov. 30, 2020, Austrian Application No. A50259/2021 filed on Apr. 8, 2021, and Austrian Application No. A50260/2021 filed on Apr. 8, 2021, the disclosures of which are incorporated by reference. The international application under PCT article 21(2) was not published in English.

The invention relates to a method and to an assembling device for changing individual slide bearing pads of a rotor bearing arrangement.

A bearing element for mounting the rotor hub of a wind turbine is known from WO 2011/127510 A1.

Due to their size, the bearing pads of such bearing arrangements, as they are known from WO 2011/127510 A1, can be changed only with difficulty.

It was the object of the present invention to overcome the disadvantages of the prior art and to make available a method and a device, by means of which a simplified changing of the individual bearing pads of the rotor bearing arrangement is possible.

This object is achieved by means of a method and a device in accordance with the claims.

In accordance with the invention, a method for changing slide bearing pads arranged on a rotor shaft of a rotor bearing arrangement of a wind turbine is provided, comprising the method steps:
  moving the slide bearing pad to be changed to a removal opening by rotating the rotor shaft;
  releasing an axial securing element, or releasing fastening screws, of the slide bearing pad to be changed;
  axially removing the slide bearing pad to be changed through the removal opening;
  axially inserting a new slide bearing pad through the removal opening;
  fixing the new slide bearing pad by means of the axial securing element, or by means of the fastening screws.

A slide bearing pad changing device with a manipulation arm is used for axially removing the slide bearing pad to be changed and for axially inserting a new slide bearing pad, wherein the manipulation arm is configured for coupling with the slide bearing pad. It can further be provided that the manipulation arm is configured so as to be movable relative to the base frame.

The method in accordance with the invention results in the advantage that, by using a slide bearing pad changing device and/or by axially removing the slide bearing pads, the maintenance of the wind turbine can be simplified substantially. This ensures that not only occupational health and safety but additionally also efficiency can be increased.

It can further be expedient if the manipulation arm is coupled with the slide bearing pad by means of a connection element, in particular by means of a screw, wherein a form element, in particular a thread, that interacts with the connection element is configured on a front end of the slide bearing pad. This results in the advantage that the slide bearing pad can be coupled with the manipulation arm in a simple manner by means of the connection element, so that a simple change of the slide bearing pads is enabled.

It can further be provided that the base frame is affixed to the rotor shaft by means of a fastening element, in particular by means of a tensioning strap. This results in the advantage that, through this measure, the slide bearing pad changing device can be retained stably in position, so that hazards that might occur during the slide bearing pad change can be minimized.

Additionally or alternatively, it can be provided that the base frame of the slide bearing pad changing device is affixed to the shaft nut by means of fastening means.

In another alternative variant, it can be provided that the base frame is affixed to a bearing block by means of a fastening means. This results in the advantage that, through this measure, the slide bearing pad changing device can be retained stably in position, so that hazards that might occur during the slide bearing pad change can be minimized.

It can further be provided that a lifting arm is used for removing the slide bearing pad from the manipulation arm and for affixing a new slide bearing pad to the manipulation arm, wherein the lifting arm is affixed to a circumferential face of the slide bearing pad such that the manipulation arm and the lifting arm can be affixed to the slide bearing pad simultaneously. This results in the advantage that the slide bearing pad can be axially pulled out from the outer ring element, starting from its operating position, by means of the slide bearing pad changing device and can subsequently be removed from the manipulation arm by means of the lifting arm, for example by means of a crane. When inserting a new slide bearing pad, the new slide bearing pad can be lifted, in reverse sequence, to the manipulation arm by means of the lifting arm in order to be received on the manipulation arm and to be inserted in an axial direction in its operating position by means of the manipulation arm.

Furthermore, it can be provided that the movement of the manipulation arm relative to the base frame of the slide bearing pad changing device is driven by a cordless screwdriver. This results in the advantage that the slide pad changing device need not have a separate drive and can therefore have a structure that is as inexpensive and simple as possible. Furthermore, a cordless screwdriver is a standard tool which maintenance staff normally always carry on their person.

Slide bearing pad changing device for changing slide bearing pads arranged on a rotor shaft of a rotor bearing arrangement of a wind turbine, the slide bearing pad changing device comprising:
  a base frame;
  a manipulation arm, which is displaceable relative to the base frame, wherein the manipulation arm is configured for coupling with the slide bearing pad.

The slide bearing pad changing device in accordance with the invention results in the advantage that, by using a slide bearing pad changing device and/or by axially removing the slide bearing pads, the maintenance of the wind turbine can be simplified substantially. This ensures that not only occupational health and safety but additionally also efficiency can be increased.

In accordance with one advancement, it is possible that the manipulation arm is arranged on a guide carriage, which is coupled with a linear guide, wherein the guide carriage is displaceable relative to the base frame by means of an adjusting spindle. This results in the advantage that, through this measure, the manipulation arm can be moved relative to the base frame in a simple manner in order to enable the slide bearing pad change.

It can further be expedient if the adjusting spindle is torque-coupled with a shaft journal, wherein the shaft journal is configured such that it can be coupled with a cordless screwdriver. This results in the advantage that the slide pad changing device need not have a separate drive and can therefore have a structure that is as inexpensive and simple as possible. Furthermore, a cordless screwdriver is a standard tool which maintenance staff normally always carry on their person. Alternatively, it can be provided that a hand crank is arranged on the shaft journal.

Furthermore, it can be provided that a first roller conveyor and a second roller conveyor are coupled with the base frame, wherein the first roller conveyor and the second roller conveyor each have multiple bearing rollers, wherein the first roller conveyor and the second roller conveyor are arranged at a mutual distance, wherein the manipulation arm is arranged between the first roller conveyor and the second roller conveyor. The slide bearing pad can be moved out of its seat in the slide bearing arrangement gently by means of the first roller conveyor and the second roller conveyor. Here, the slide bearing pad can rest on the two roller conveyors and therefore be axially displaced in a simple manner.

It can further be provided that the first roller conveyor and the second roller conveyor are cranked downward at a frontal end. This results in the advantage that, through this measure, the slide bearing pad can be moved across a shaft nut affixed to the rotor shaft in a simple manner.

In accordance with one particular embodiment, it is possible that the linear guide is arranged at an angle to a shaft support surface of the base frame. This results in the advantage that the slide bearing pad cannot only be axially pulled out of its seat in the slide bearing arrangement, but the slide bearing pad can also simultaneously be lifted while being axially pulled out.

It can further be provided that the manipulation arm has at least a first manipulation arm part and a second manipulation arm part, wherein the first manipulation arm part is configured for coupling with the slide bearing pad and wherein the first manipulation arm part is displaceable relative to the second manipulation arm part in a circumferential direction. This results in the advantage that, through this measure, the slide bearing pad can be precisely positioned in its operating position.

It can further be provided that the manipulation arm is displaceable relative to the guide carriage in a radial direction. This results in the advantage that, through this measure, the slide bearing pad can be precisely positioned in its operating position.

In accordance with one advantageous advancement, it can be provided that the manipulation arm is arranged on a lifting carriage of a lifting device, wherein the lifting device serves to increase the distance between the manipulation arm and the linear guide. This results in the advantage that the slide bearing pad can be actively lifted off the rotor shaft.

In particular, it can be advantageous if the manipulation arm has at least a first manipulation arm part and a second manipulation arm part, wherein the first manipulation arm part is configured for coupling with the slide bearing pad, wherein the first manipulation arm part and the second manipulation arm part are coupled with each other by means of a first rotational joint, so that the first manipulation arm part, along with a slide bearing pad coupled therewith, is mounted so as to be pivotable relative to the second manipulation arm part. This results in the advantage that the slide bearing pad can be rotated and/or threaded out of its seat in the slide bearing arrangement with a combination of an axial movement and a rotational movement.

It can further be provided that the second manipulation arm part is coupled with the lifting carriage of the lifting device by means of a second rotational joint so as to be pivotable. This results in an additional simplification of the removal of the slide bearing pad.

Furthermore, it can be provided that the first rotational joint has a first rotary limiter, by means of which a pivoting angle between the first manipulation arm part and the second manipulation arm part is limited, in particular that the pivoting angle is limited to smaller than 10°, preferably limited to smaller than 5°, and/or that the second rotational joint has a second rotary limiter, by means of which a pivoting angle between the second manipulation arm part and the lifting carriage of the lifting device is limited, in particular that the pivoting angle is limited to smaller than 10°, preferably limited to smaller than 5°. This results in the advantage that the slide bearing pad changing device, in particular the manipulation arm, on the one hand, allows for a certain pivotability for tilting the slide bearing pad, and, due to the rotary limitation, the slide bearing pad can simultaneously be lifted, despite an eccentric fastening point on the slide bearing pad and therefore an application of a tilting moment.

For the purpose of better understanding of the invention, it will be elucidated in more detail by means of the figures below.

Figure 2:
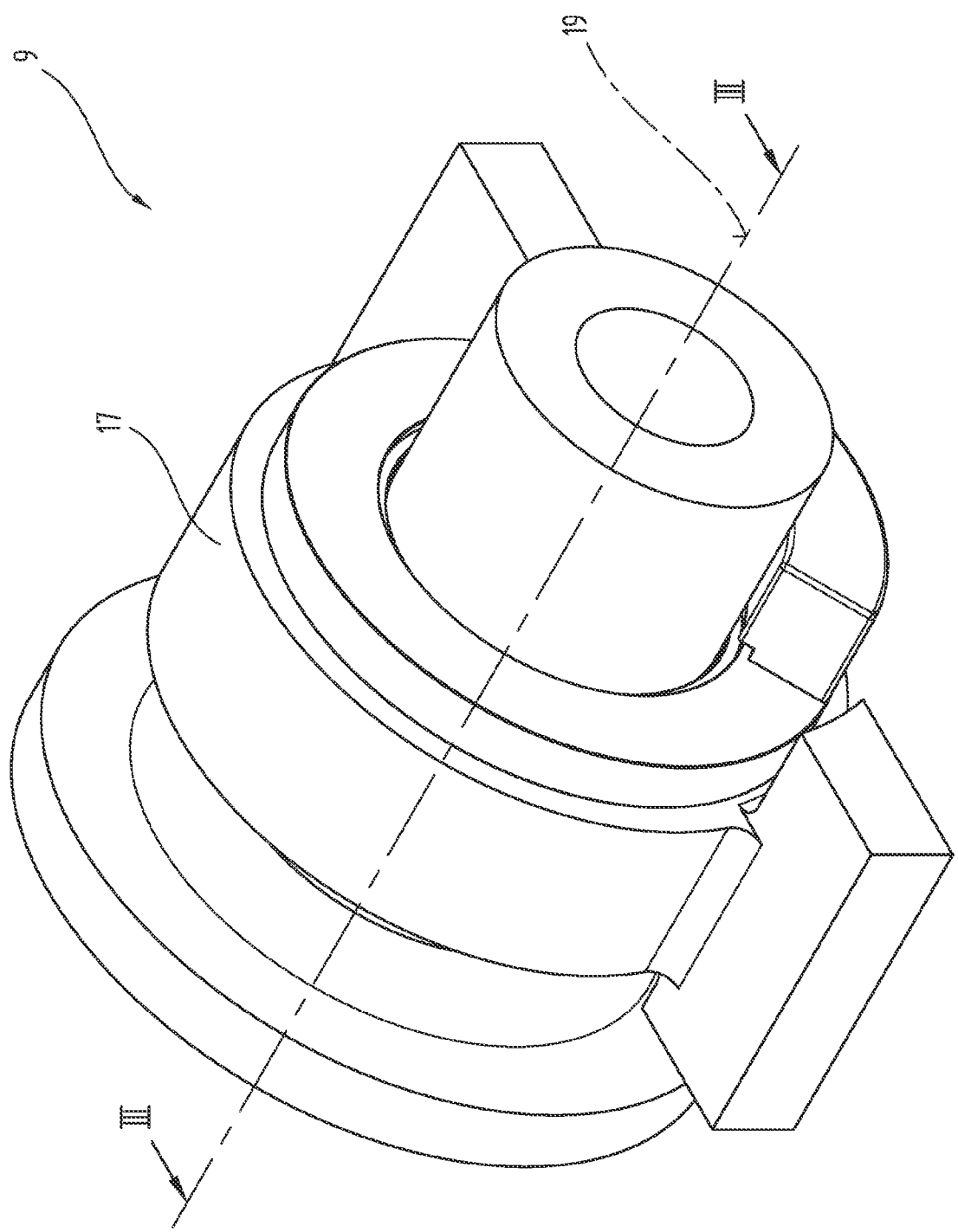
Figure 3:
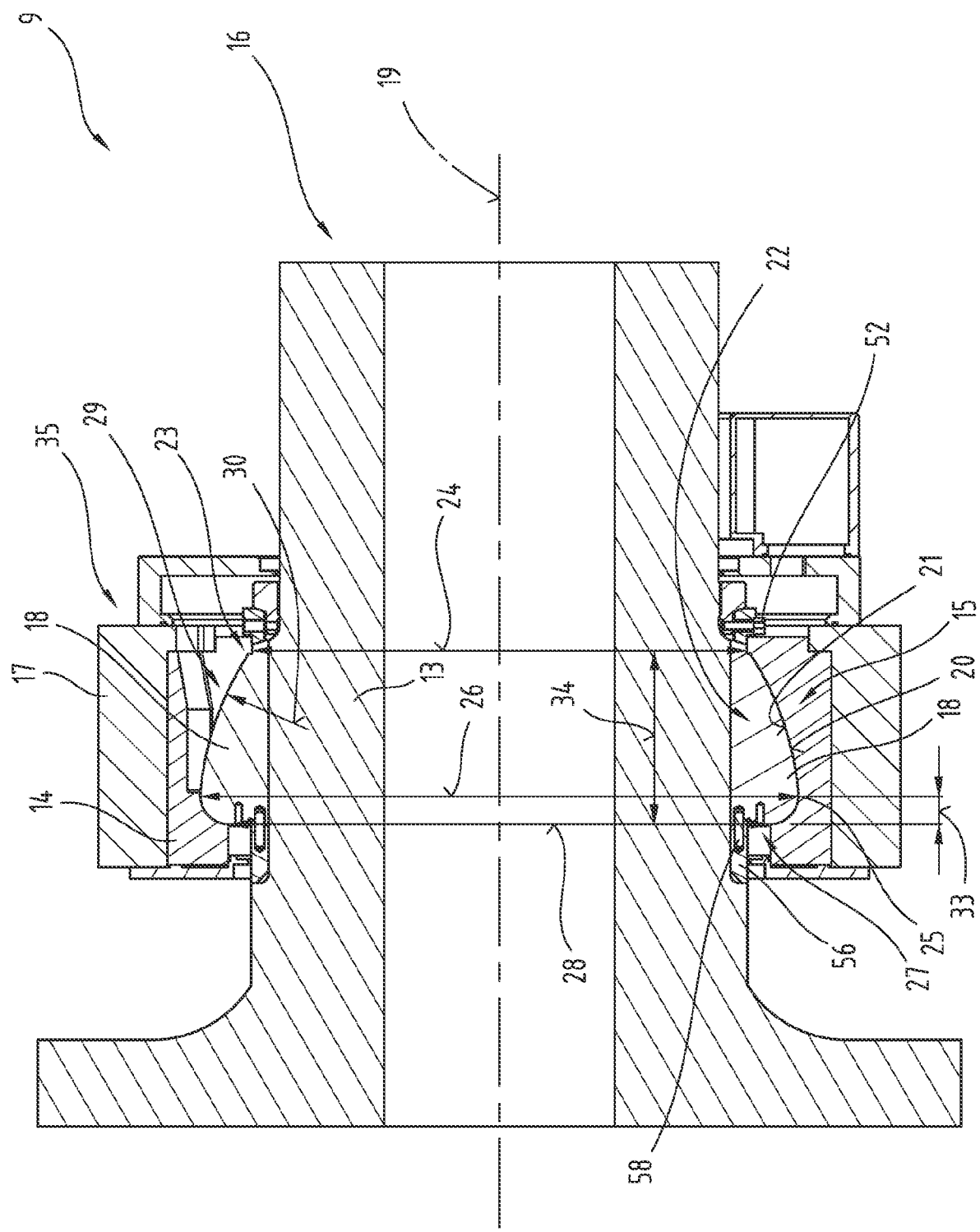
Figure 4:
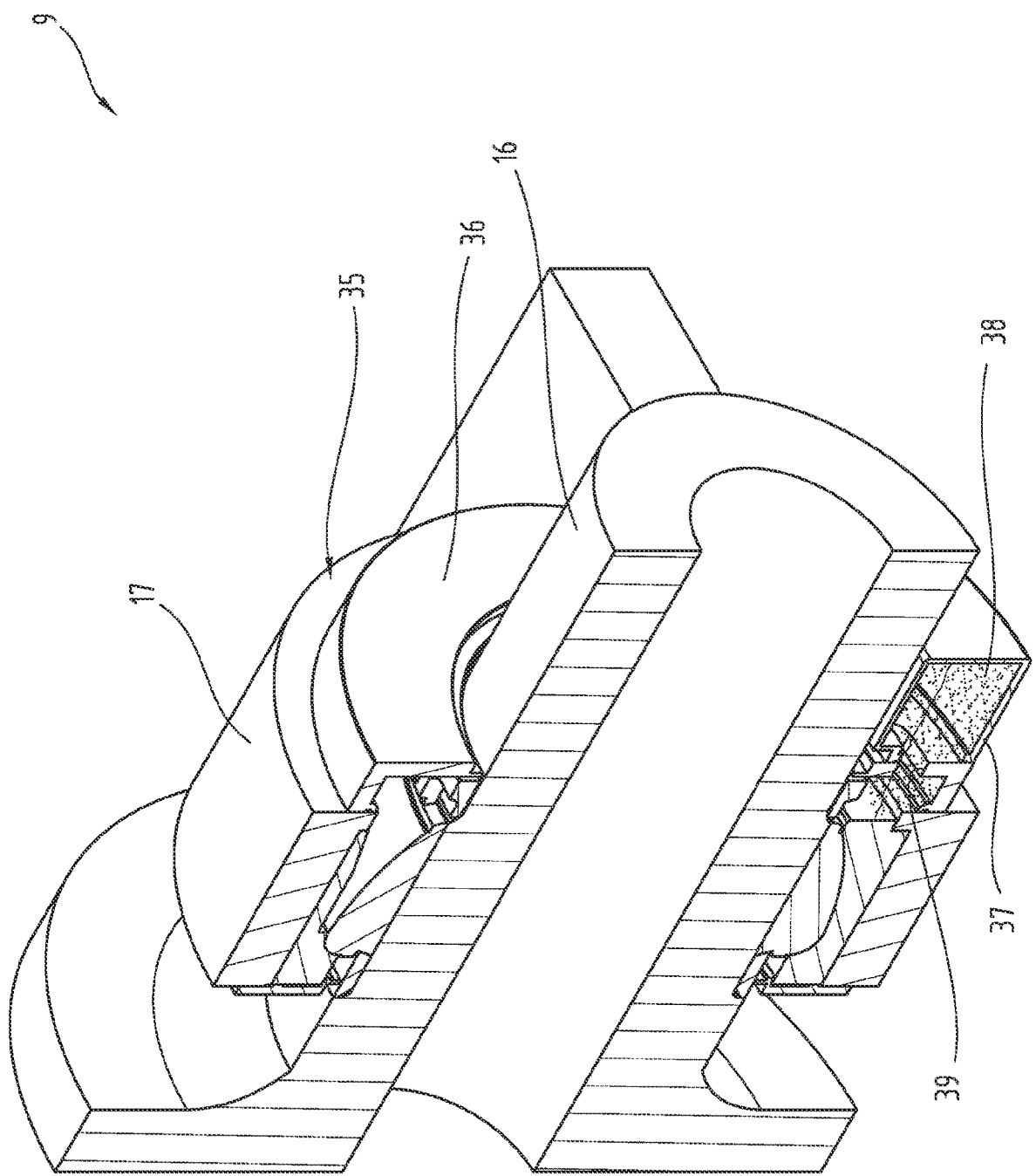
Figure 5:
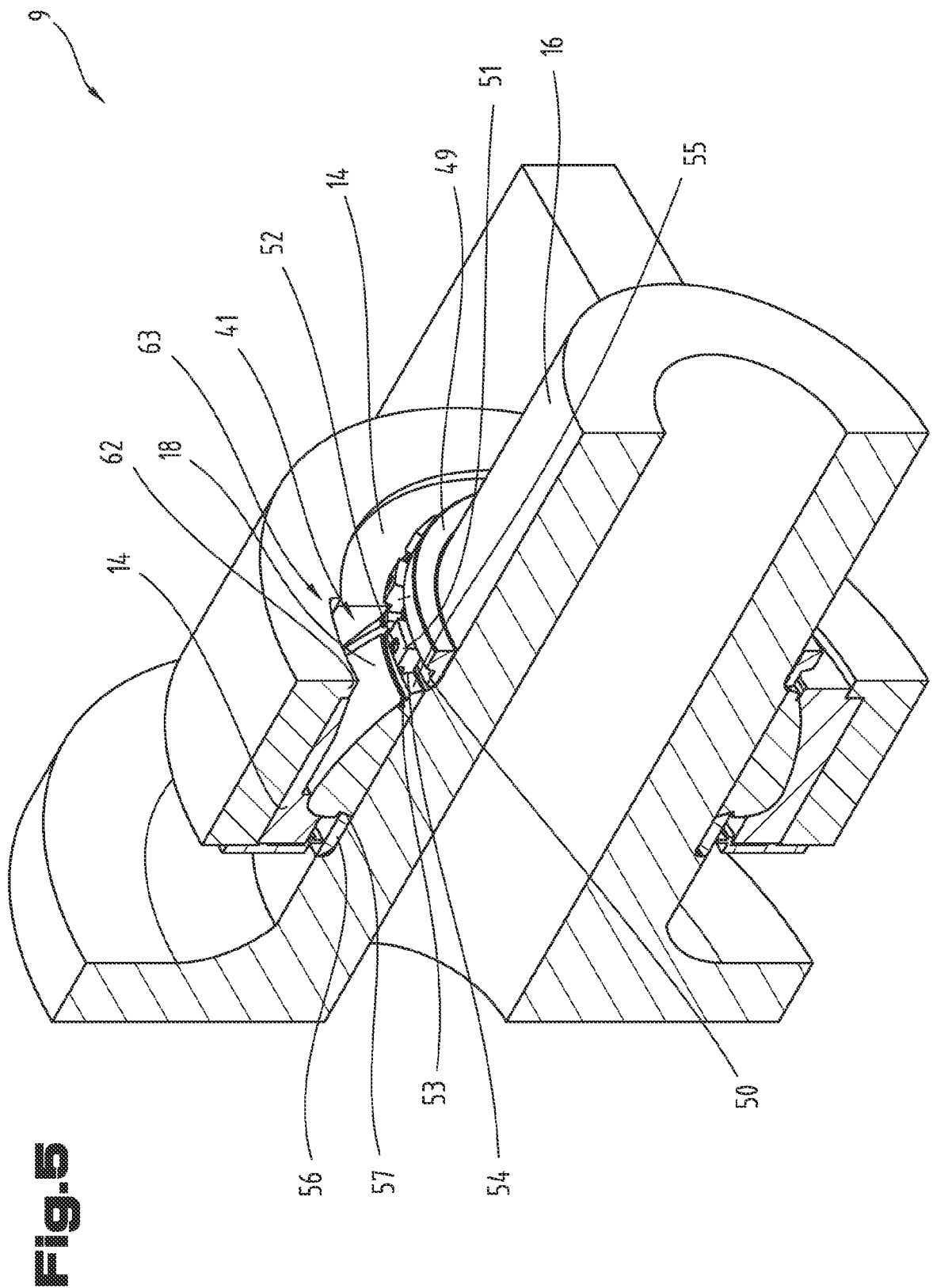
Figure 6:
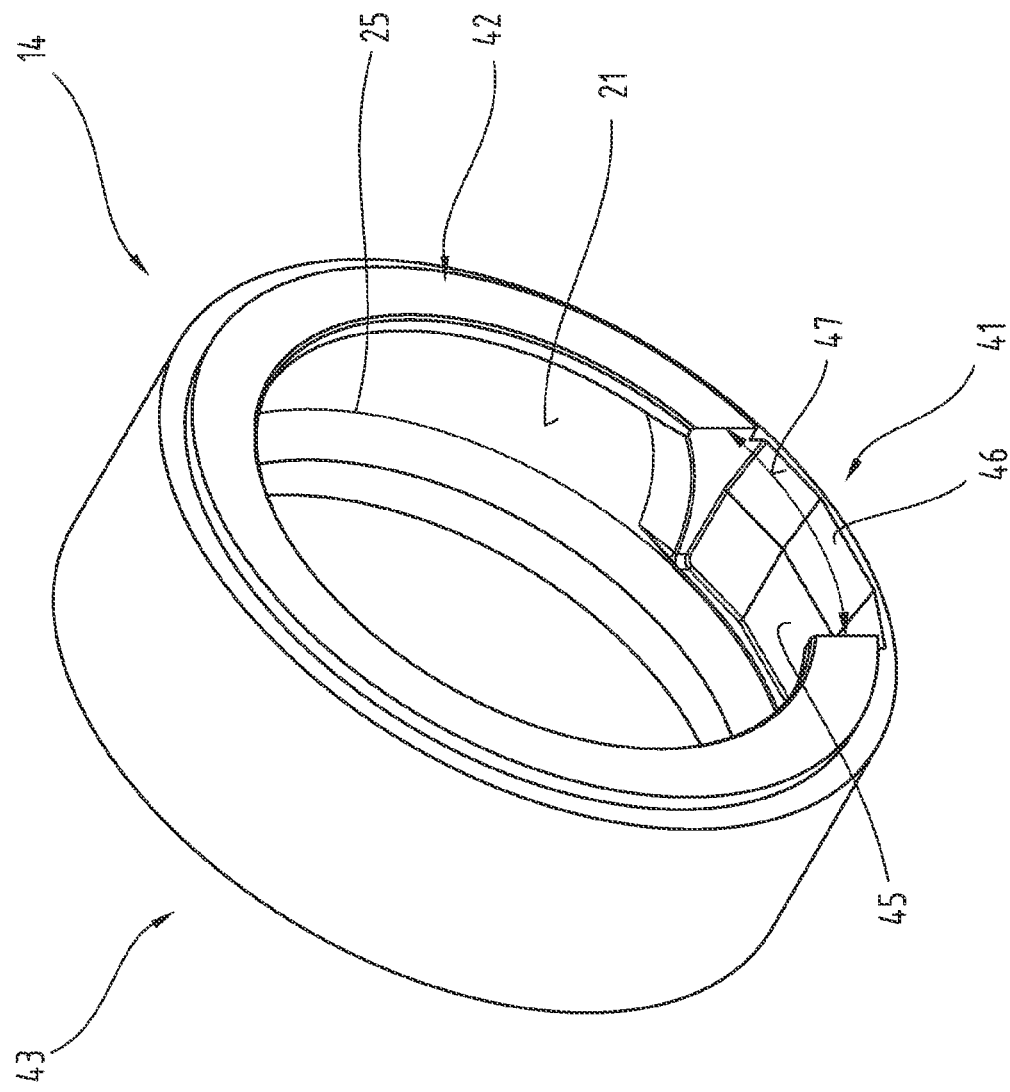
Figure 7:
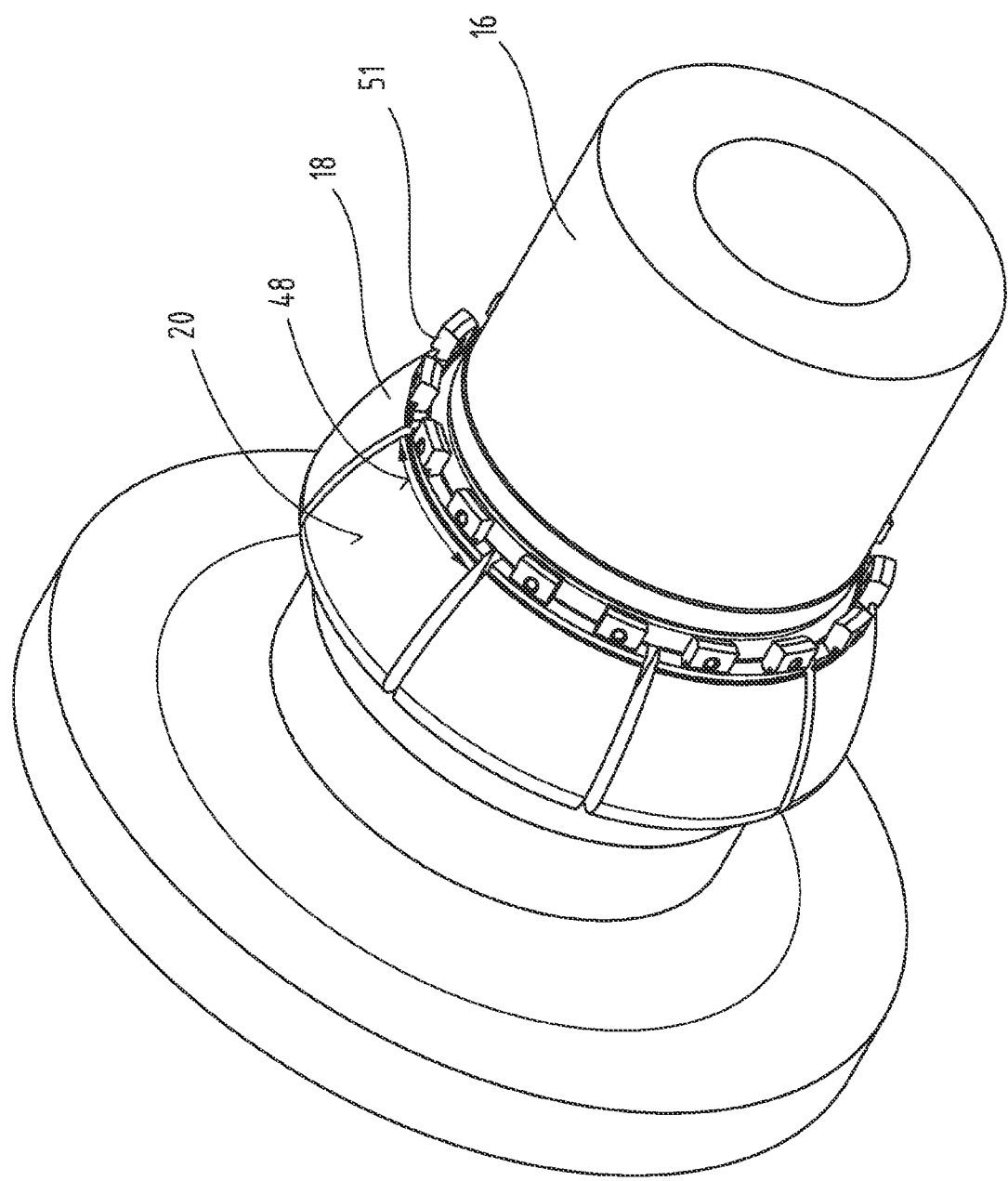
Figure 8:
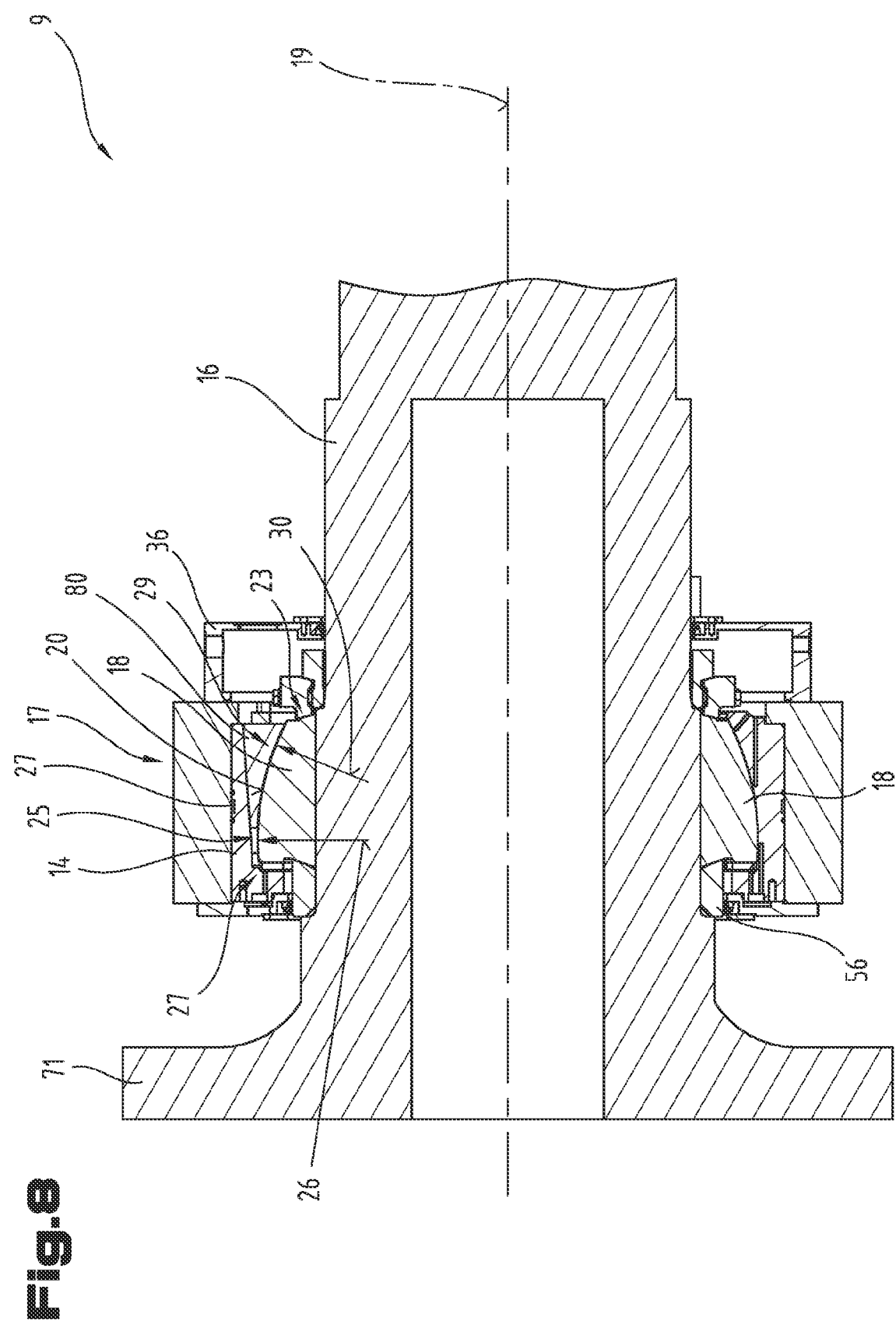
Figure 9:
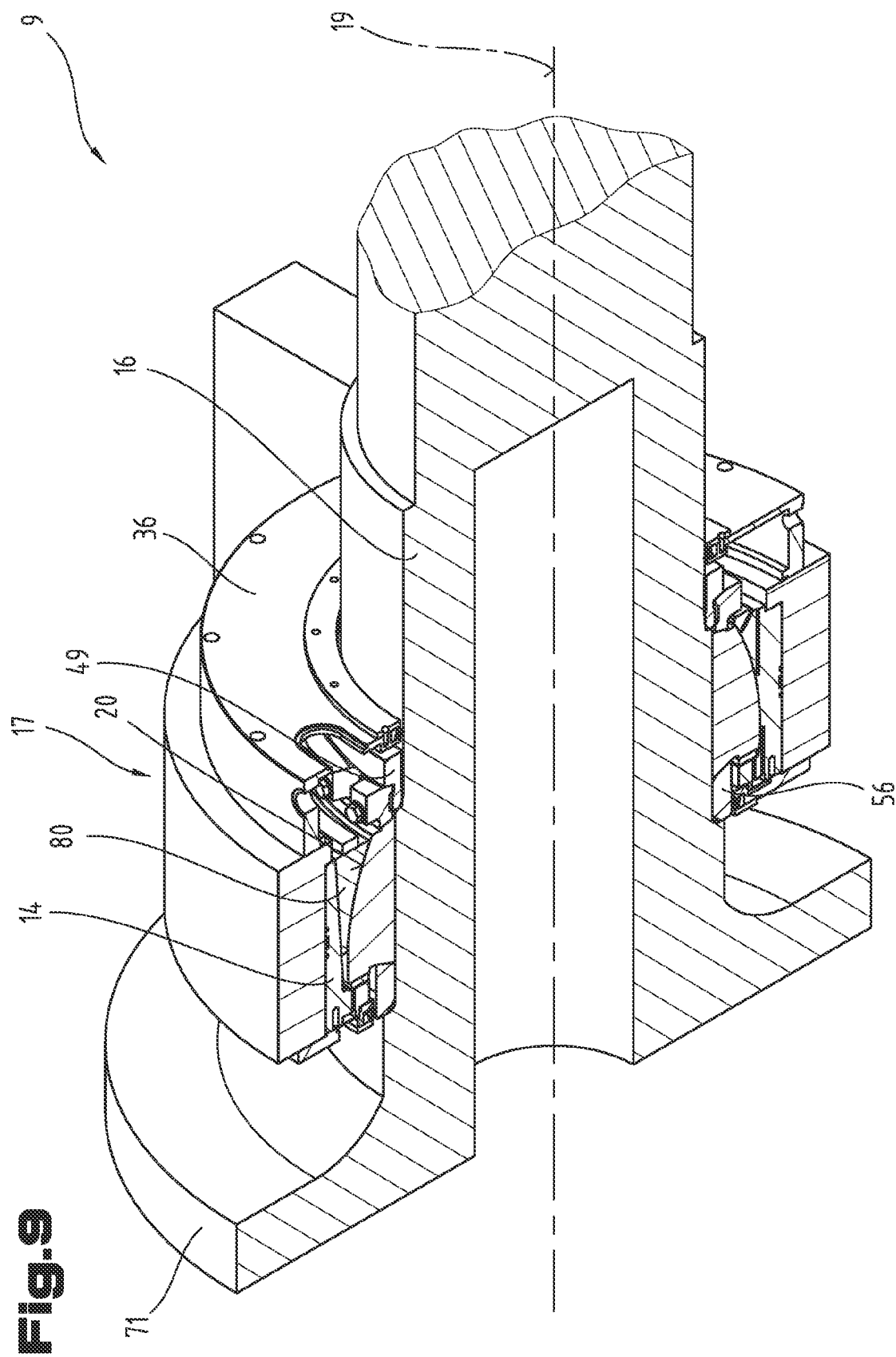
Figure 10:
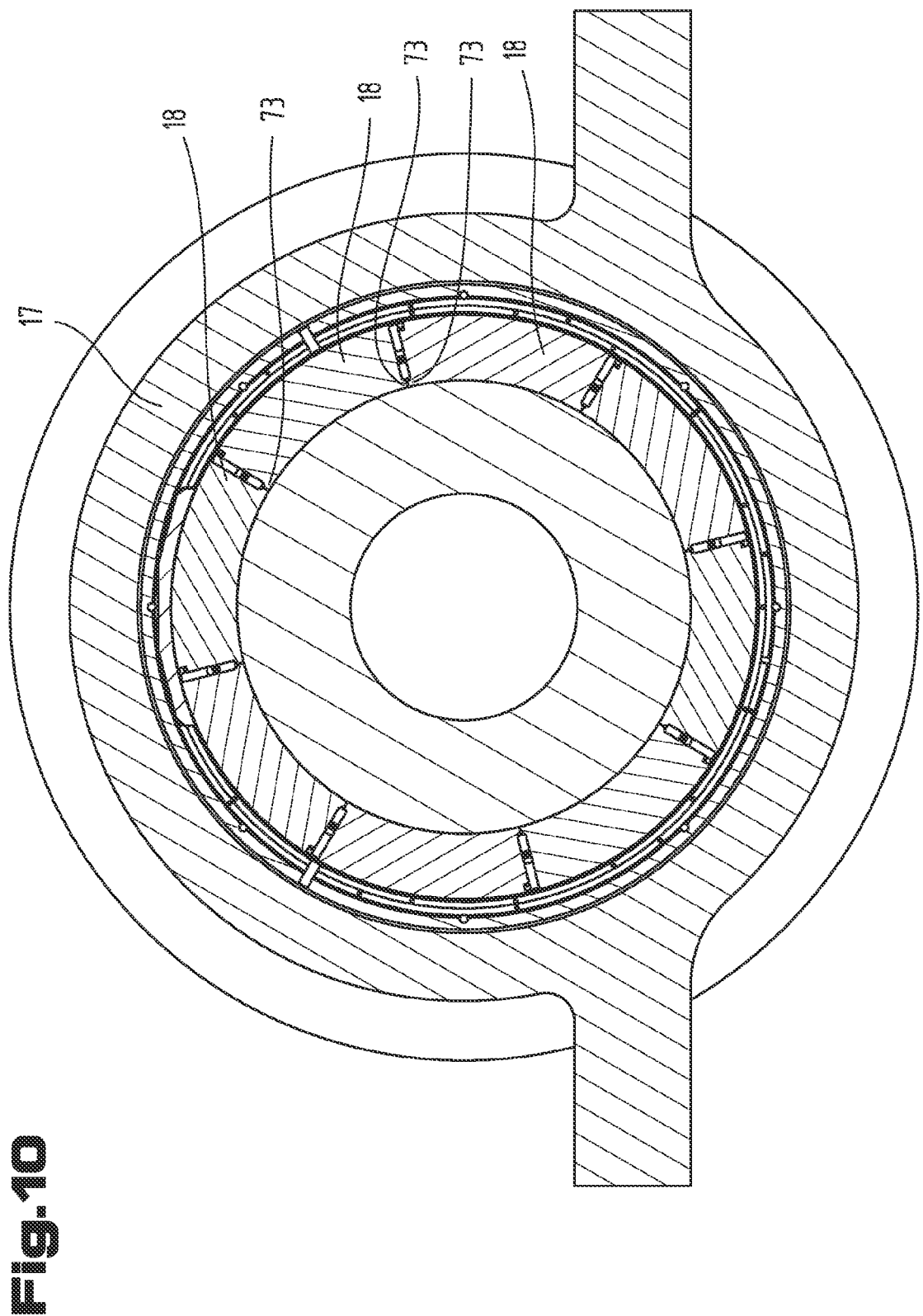
Figure 11:
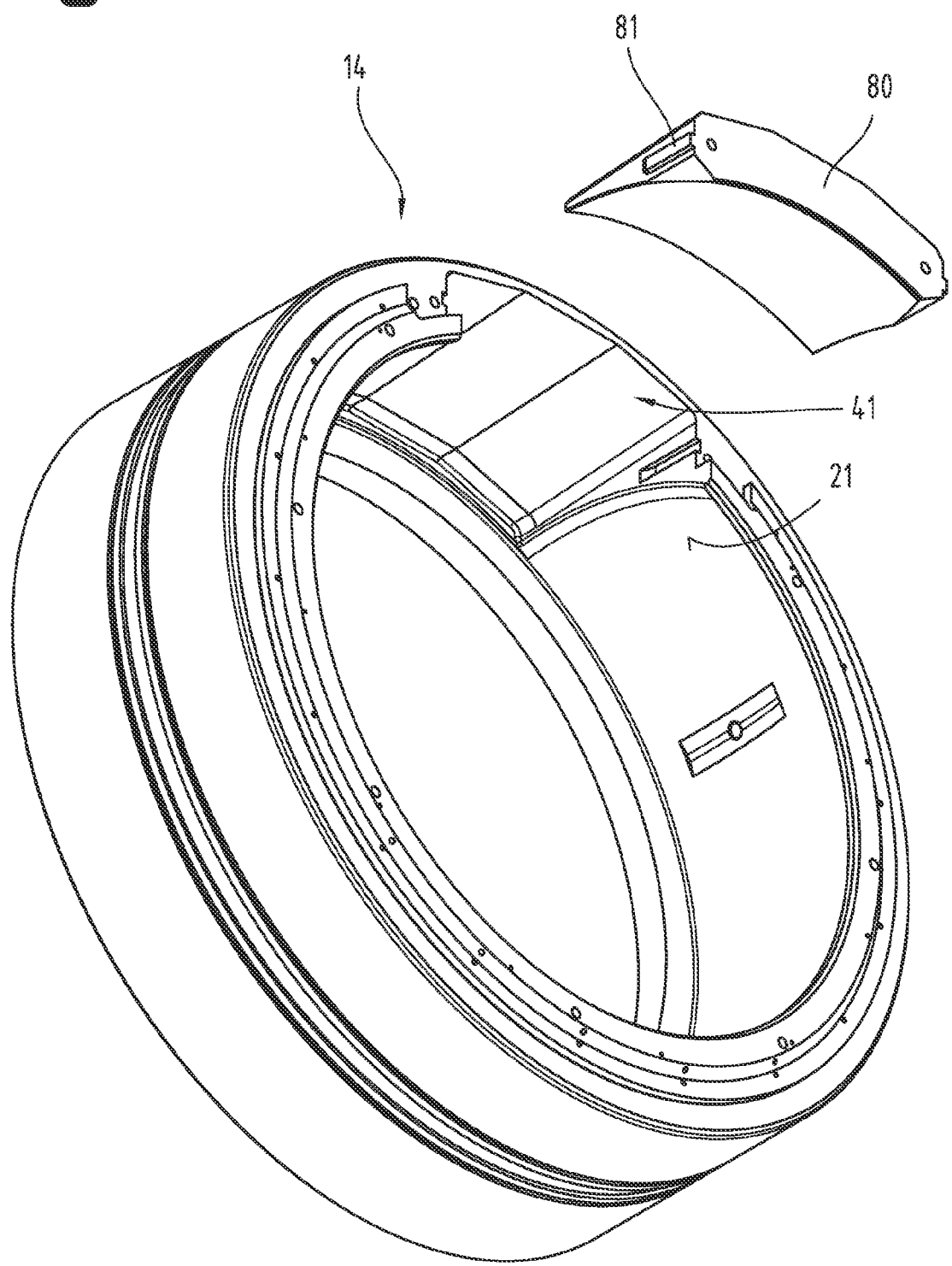
Figure 12:
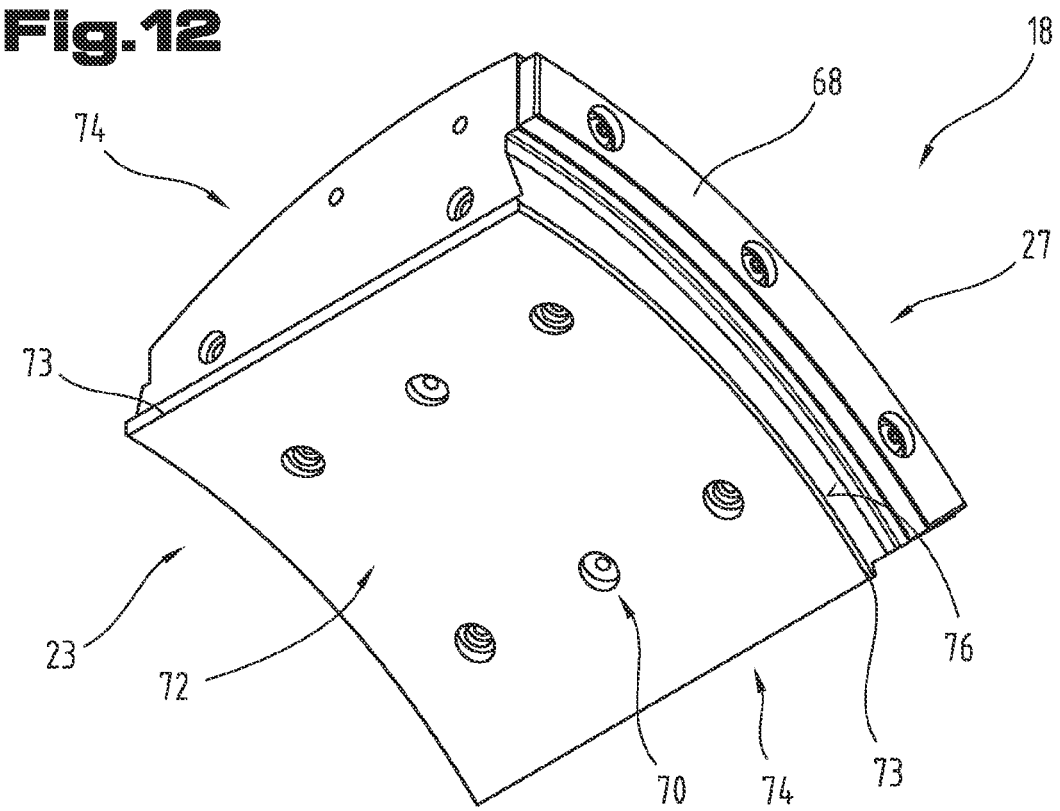
Figure 13:
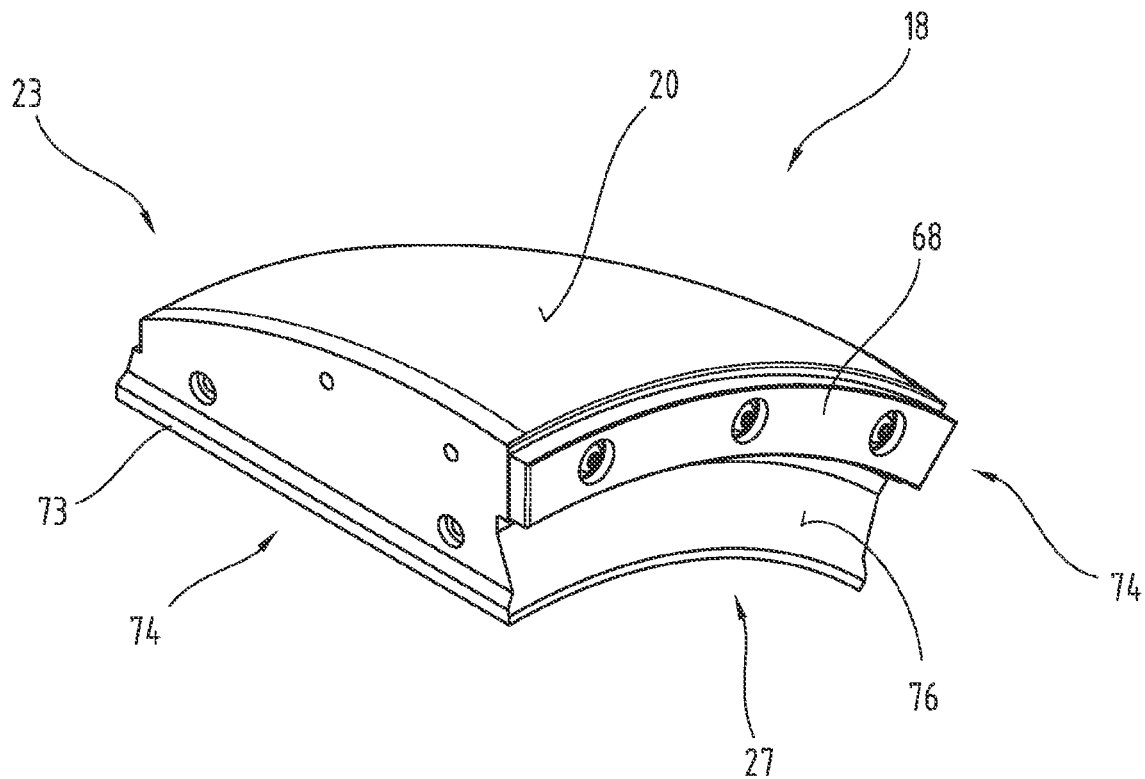
Figure 14:
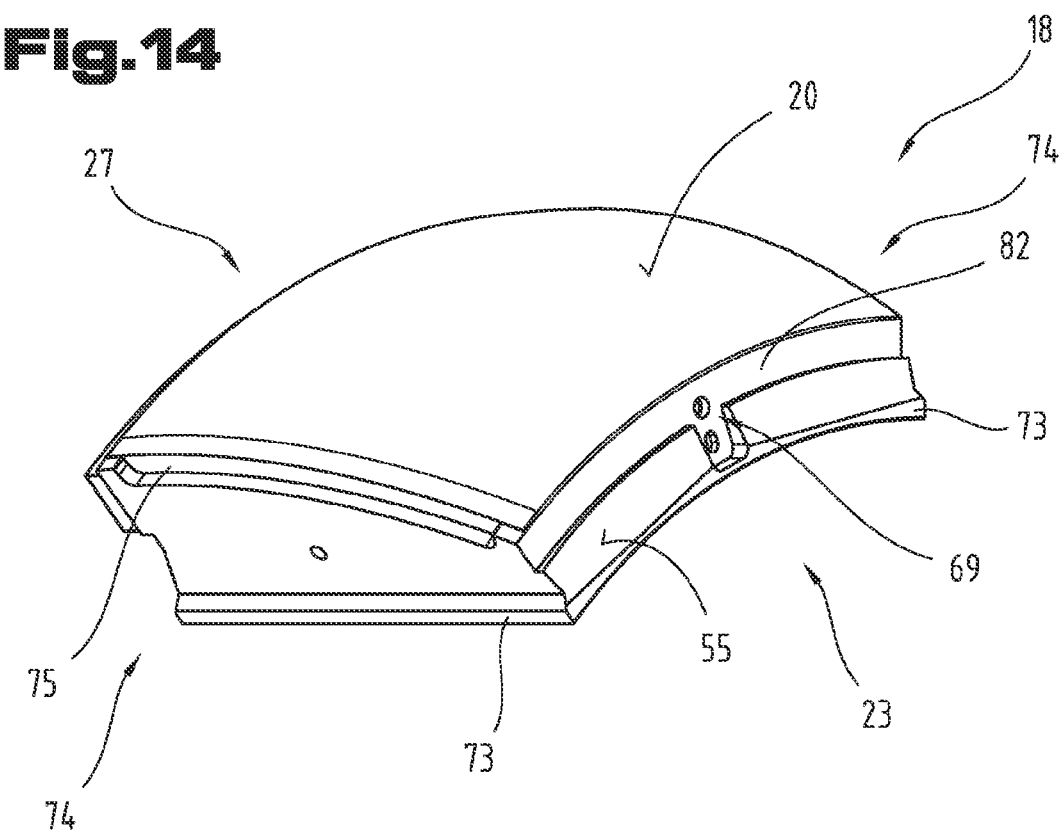
Figure 15:
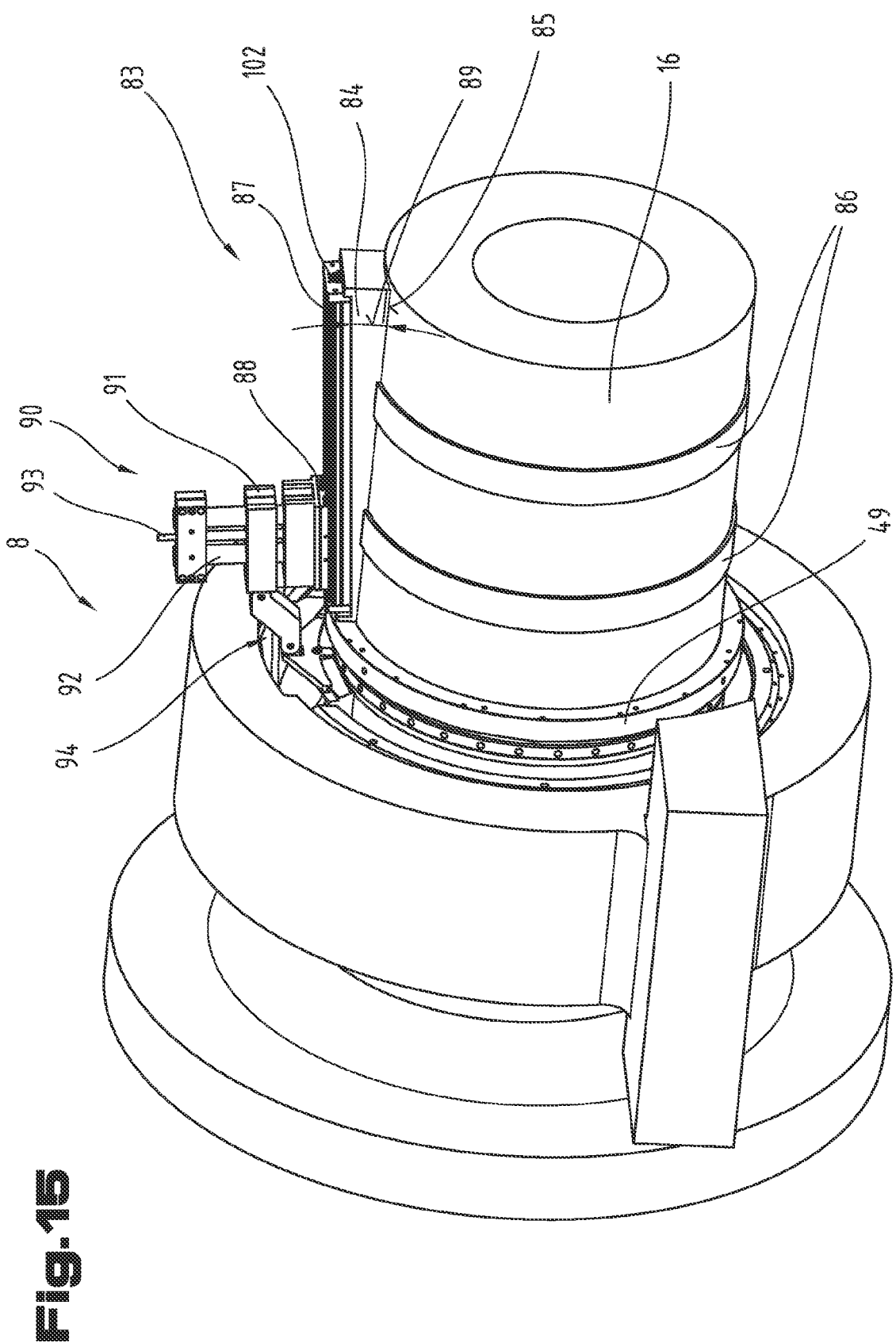
Figure 16:
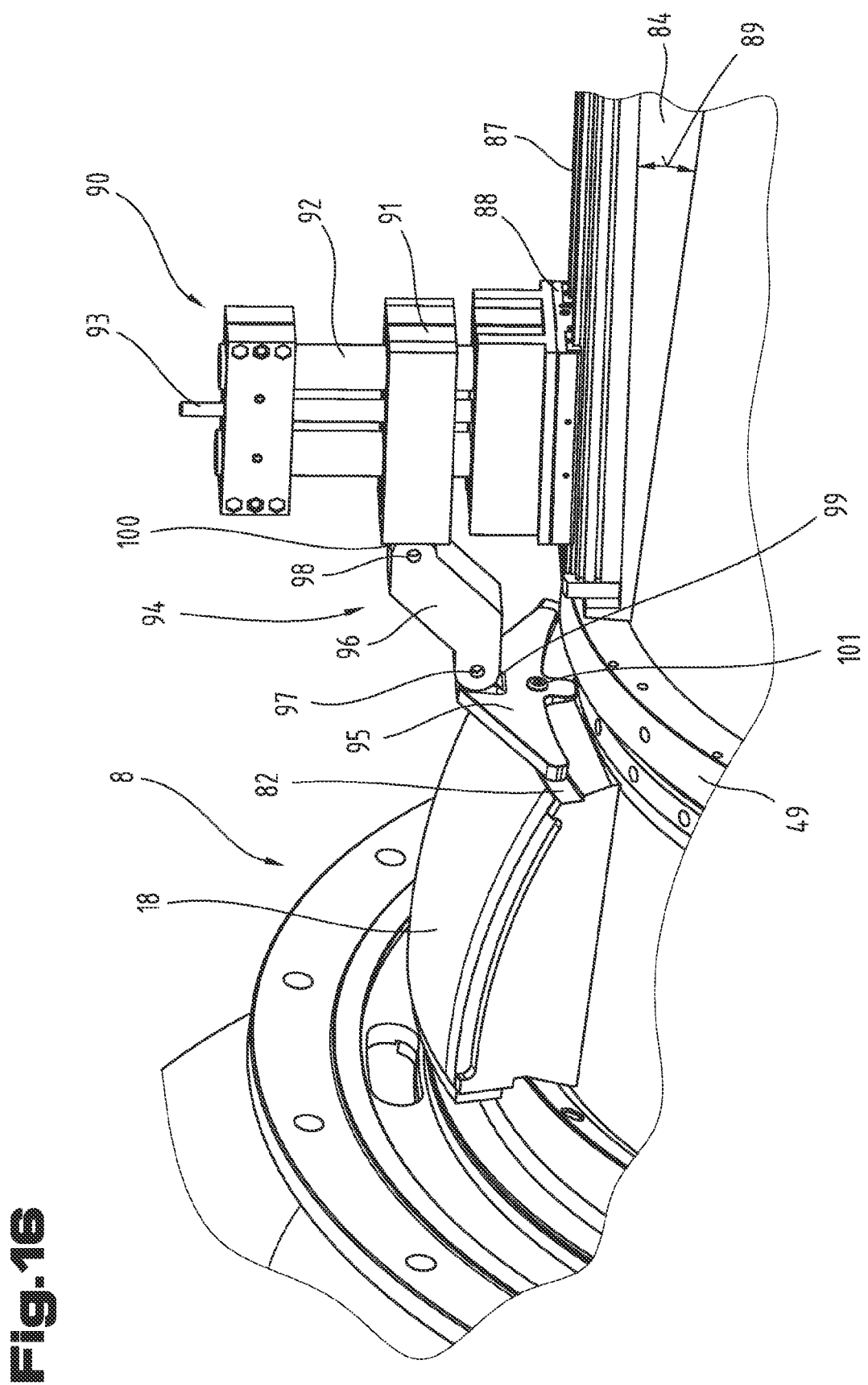
Figure 17:
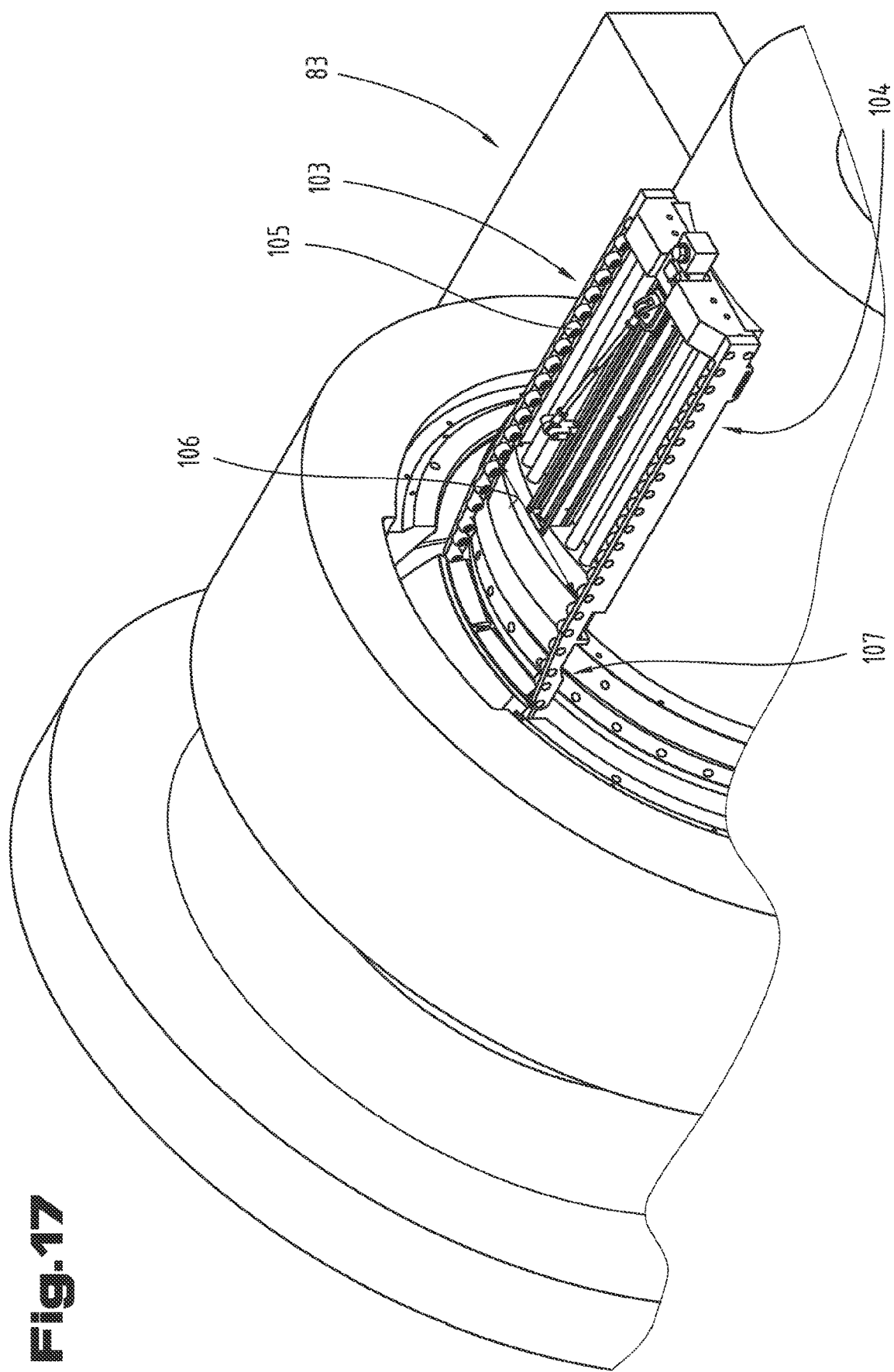
Figure 18:
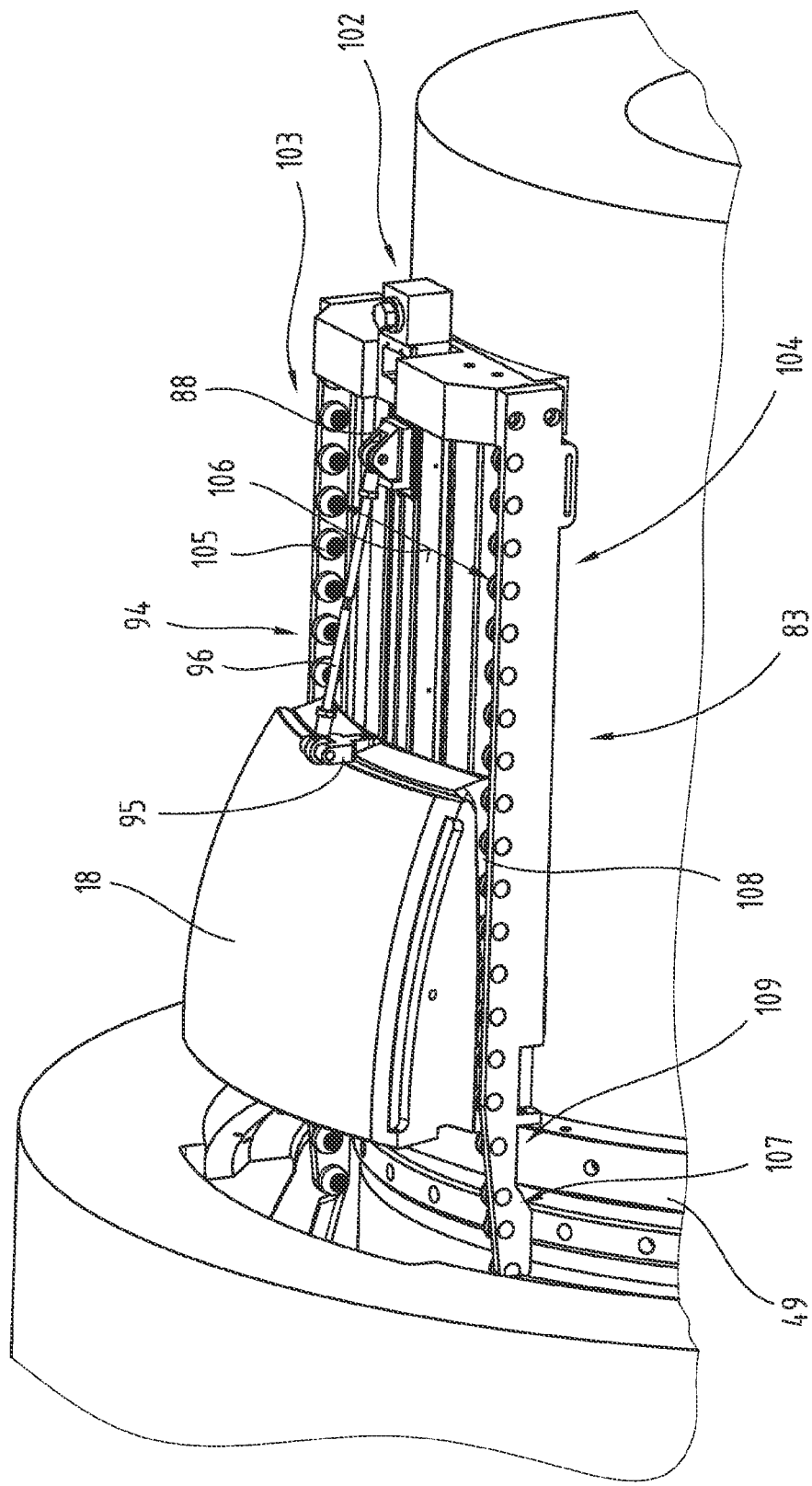
Figure 19:
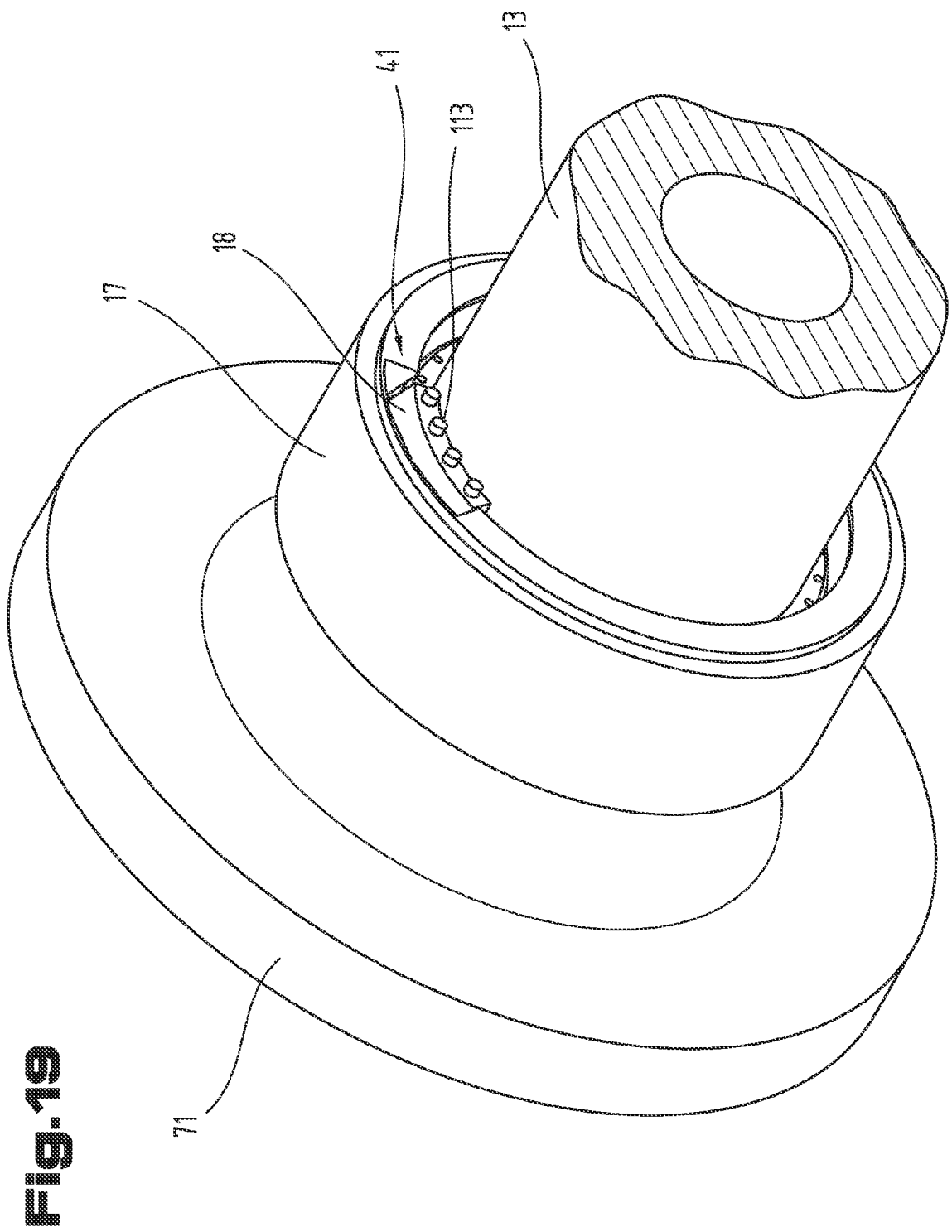
Figure 20:
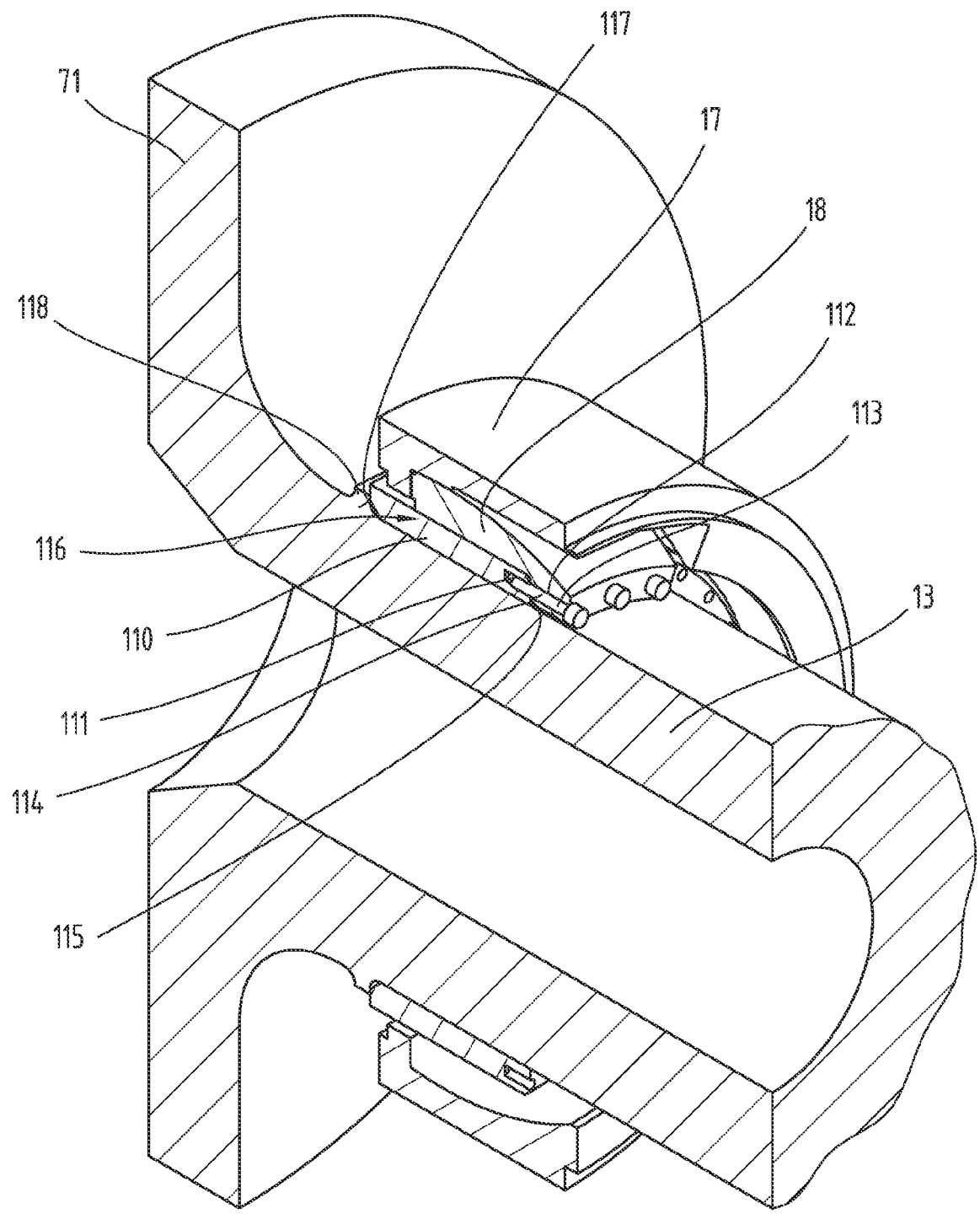
Figure 21:
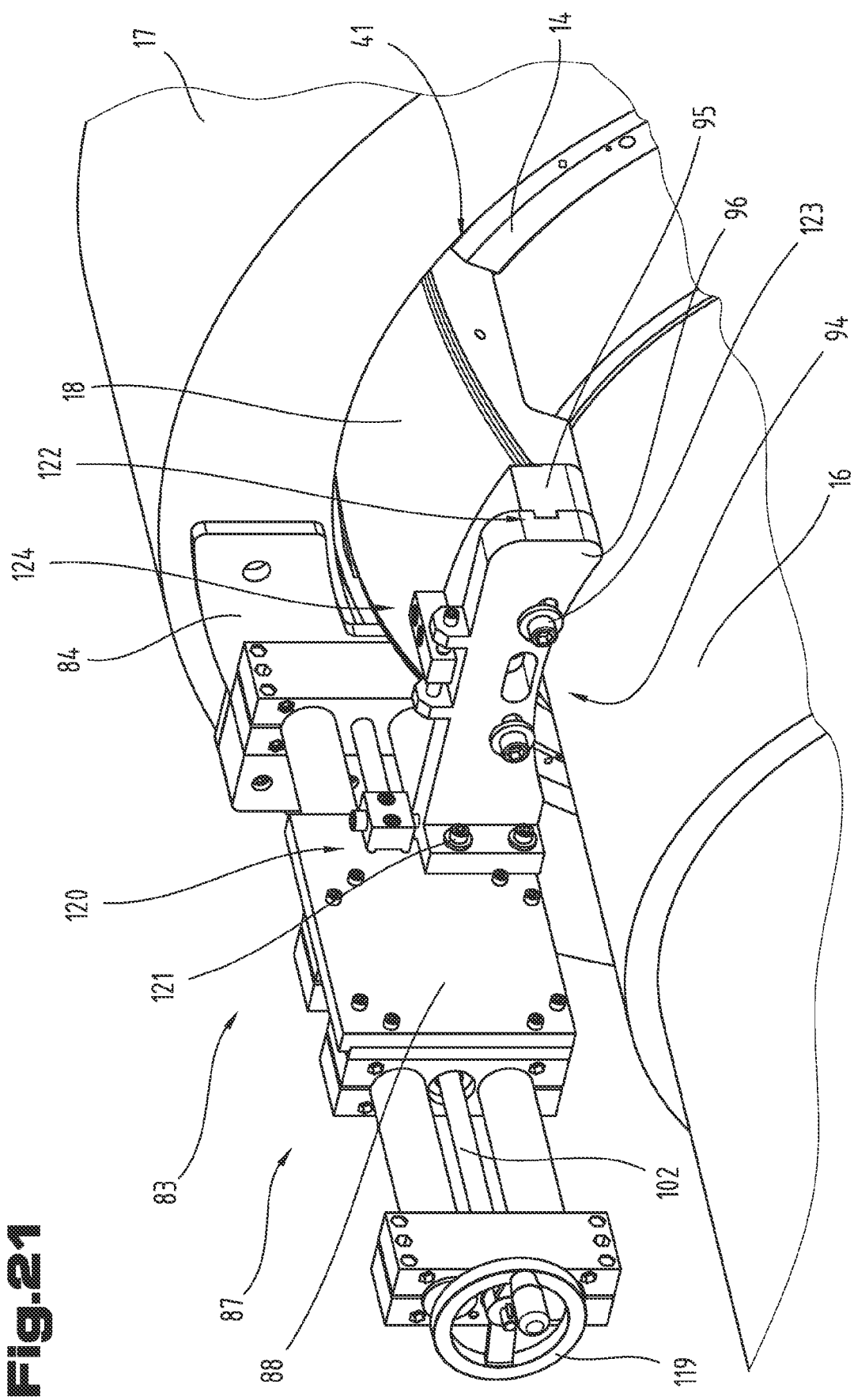
Figure 22:
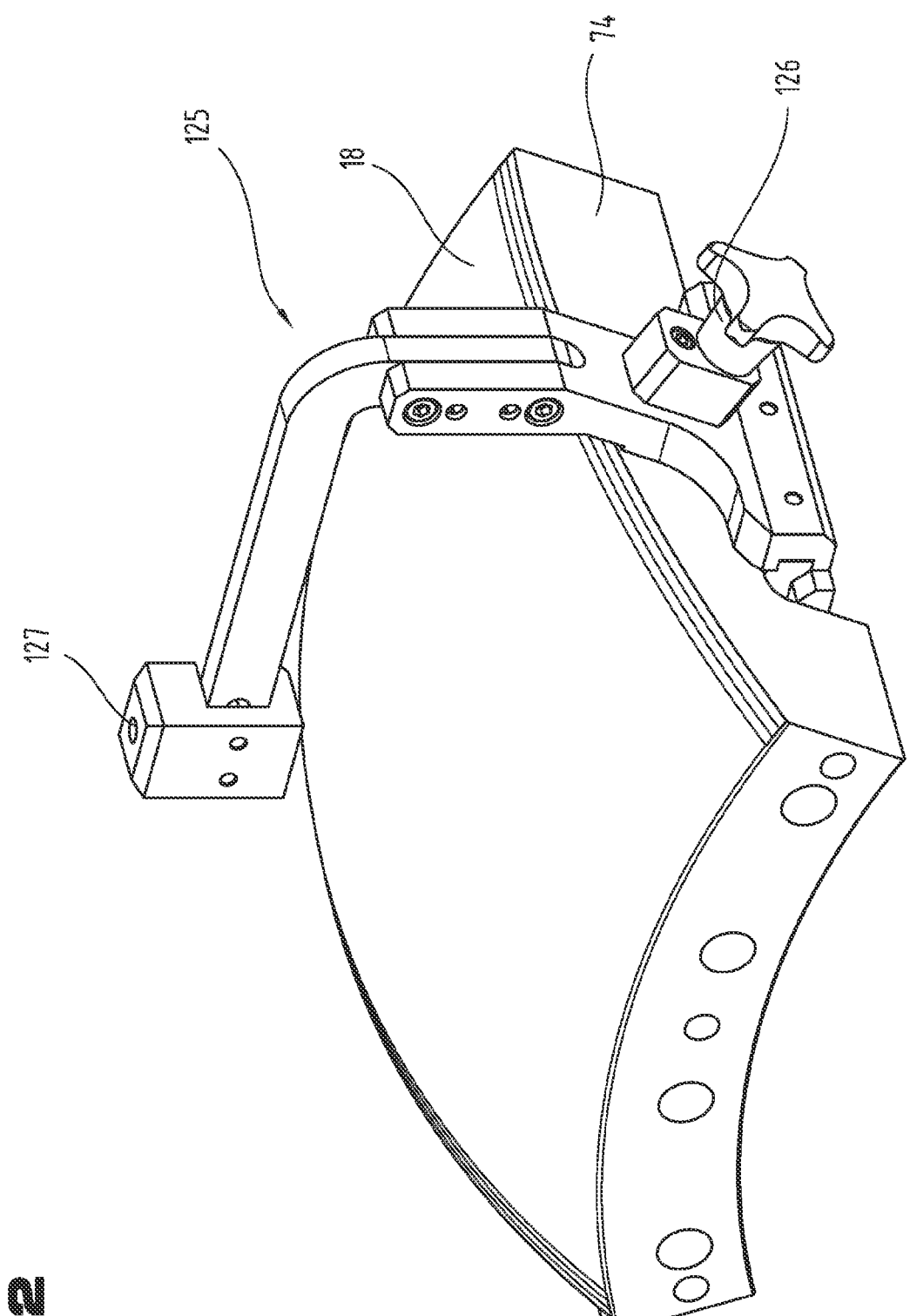

These show in a respectively very simplified schematic representation:

FIG. 1 a schematic representation of a wind turbine;

FIG. 2 a perspective representation of a first exemplary embodiment of a slide bearing arrangement;

FIG. 3 a longitudinal section of the first exemplary embodiment of the slide bearing arrangement;

FIG. 4 a perspective view of the longitudinal section of the first exemplary embodiment of the slide bearing arrangement;

FIG. 5 a perspective view of the longitudinal section of the first exemplary embodiment of the slide bearing arrangement, wherein a cover is blanked out;

FIG. 6 a perspective view of the first exemplary embodiment of an outer ring element;

FIG. 7 a perspective view of the first exemplary embodiment of a rotor shaft with slide bearing pads arranged thereupon;

FIG. 8 a longitudinal section of a third exemplary embodiment of the slide bearing arrangement;

FIG. 9 a perspective view of the longitudinal section of the third exemplary embodiment of the slide bearing arrangement;

FIG. 10 a cross section of the third exemplary embodiment of the slide bearing arrangement;

FIG. 11 a perspective representation of an outer ring element of the third exemplary embodiment of the slide bearing arrangement;

FIG. 12 a slide bearing pad of the third exemplary embodiment of the slide bearing arrangement in a first perspective representation;

FIG. 13 the slide bearing pad of the third exemplary embodiment of the slide bearing arrangement in a second perspective representation;

FIG. 14 the slide bearing pad of the third exemplary embodiment of the slide bearing arrangement in a third perspective representation;

FIG. 15 a first exemplary embodiment of a slide bearing pad changing device in a first perspective view;

FIG. 16 the first exemplary embodiment of the slide bearing pad changing device in a second, detailed perspective view;

FIG. 17 a second exemplary embodiment of the slide bearing pad changing device in a first perspective view;

FIG. 18 the second exemplary embodiment of the slide bearing pad changing device in a second perspective view;

FIG. 19 another exemplary embodiment of the slide bearing arrangement with slide bearing pads, which are screwed to a slide bearing pad reception ring, in a first perspective view;

FIG. 20 the other exemplary embodiment of the slide bearing arrangement with slide bearing pads, which are screwed to the slide bearing pad reception ring, in a sectional view;

FIG. 21 a third exemplary embodiment of the slide bearing pad changing device;

FIG. 22 an exemplary embodiment of a lifting arm.

First of all, it is to be noted that, in the different embodiments described, equal parts are provided with equal reference numbers and/or equal component designations, where the disclosures filled into in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, these specifications of location are to be analogously transferred to the new position.

FIG. 1 shows, in a schematic representation, a first exemplary embodiment of a wind turbine 1 for generating electric energy from wind energy. The wind turbine 1 comprises a nacelle 2, which is received on a tower 3 so as to be rotatable. The nacelle 2 comprises a nacelle housing 4, which forms the main structure of the nacelle 2. Arranged in the nacelle housing 4 of the nacelle 2 are the electrotechnical components, such as a generator of the wind turbine 1, for example.

Further, a rotor 5 is configured, which has a rotor hub 6 with rotor blades 7 arranged thereupon. The rotor hub 6 is considered part of the nacelle 2. The rotor hub 6 is received on the nacelle housing 4 by means of a rotor bearing arrangement 8 so as to be rotatably movable. In particular, it is provided that a slide bearing arrangement 9 in accordance with the invention is used as rotor bearing arrangement 8, which slide bearing arrangement 9 will be described in more detail below. In particular, it can be provided that the rotor hub 6 is arranged on a rotor shaft 16, wherein the rotor shaft 16 is mounted in the rotor bearing arrangement 8.

The rotor bearing arrangement 8, which serves to mount the rotor hub 6 on the nacelle housing 4 of the nacelle 2, is configured for receiving a radial force 10 and an axial force 11. The axial force 11 is a result of the force of the wind. The radial force 10 is a result of the weight of the rotor 5 and acts on the center of gravity of the rotor 5. As the center of gravity of the rotor 5 lies outside of the rotor bearing arrangement 8, a tilting moment 12 is caused in the rotor bearing arrangement 8 by the radial force 10. The tilting moment 12 can equally be caused by on uneven load on the rotor blades 7. This tilting moment 12 can be absorbed by means of a second bearing arrangement, which is arranged at a distance to the rotor bearing arrangement 8. The second bearing arrangement can be configured in the region of the generator, for example.

FIG. 2 shows a first exemplary embodiment of the slide bearing arrangement 9 integrated in the nacelle 2. Of course, the slide bearing arrangement 9 represented in FIG. 2 can also be used in any and all other industrial applications outside of wind turbines. The slide bearing arrangement 9 is represented in FIG. 2 in a perspective view.

FIG. 3 shows the first exemplary embodiment of the slide bearing arrangement 9 in a longitudinal sectional representation.

Subsequently, the slide bearing arrangement 9 will be described by means of a combination of FIGS. 2 and 3.

As can be seen from FIGS. 2 and 3, it can be provided that the slide bearing arrangement 9 has an inner ring element 13 and an outer ring element 14. Arranged between the inner ring element 13 and the outer ring element 14 is a slide bearing element 15, which serves to mount the inner ring element 13 relative to the outer ring element 14 in a rotational slide bearing arrangement.

In the exemplary embodiment which is represented in FIGS. 2 and 3, the inner ring element 13 is configured as rotor shaft 16. Of course, the inner ring element 13 can also be any other type of shaft. Further, it is also conceivable that the inner ring element 13 is configured as an independent component, which is received on a shaft, in particular on a rotor shaft 16.

As can be seen particularly readily from FIG. 3, it can be provided that the outer ring element 14 is received in a bearing block 17. In particular, it can be provided that the bearing block 17 is coupled with the nacelle housing 4, or is alternatively also directly shaped in the nacelle housing 4. In this exemplary embodiment, it can therefore be provided that the outer ring element 14 is rigidly coupled with the nacelle housing 4 and the inner ring element 13 is rotatable relative to the outer ring element 14 with respect to an axis of rotation 19 by means of the slide bearing element 15.

Further, it can be provided that the bearing block 17 serves directly as outer ring element 14.

Therefore, the rotor shaft 16 is received in the nacelle housing 4 by means of the slide bearing arrangement 9 so as to be rotatable.

As can further be seen from FIGS. 2 and 3, it can be provided that the slide bearing element comprises multiple individual slide bearing pads 18, which are arranged across the circumference so as to be distributed between the inner ring element 13 and the outer ring element 14.

Due to the structure shown in FIG. 3, the individual slide bearing pads 18 are firmly coupled with the inner ring element 13, and therefore rotate with same relative to the outer ring element 14, in the operating mode of the slide bearing arrangement 9. To enable the rotational movement between the inner ring element 13 and the outer ring element 14, a bearing surface is configured on each of the individual slide bearing pads 18, which rests against a mating surface 21 of the outer ring element 14 in the ready mode of the slide bearing arrangement 9.

The mating surface 21 is arranged on an inner face 22 of the outer ring element 14.

The bearing surface 20 of the slide bearing pad 18 and the mating surface 21 of the outer ring element 14 are configured as sliding surfaces, which slide against each other during operation of the slide bearing arrangement 9. In particular, it can be provided that the mating surface 21 of the outer ring element 14 is configured as a hard, wear-resistant surface, which can be formed by a hardened steel, for example. The bearing surface 20 of the slide bearing pad 18 can be formed from a slide bearing raw material that is soft in comparison to the mating surface 21. Of course, it is also conceivable that the bearing surface 20 has a slide coating.

As can be seen particularly readily from FIG. 3, it can be provided that the individual slide bearing pads 18 each have a bearing surface 20 that is cambered, viewed in an axial direction.

As can further be seen from FIG. 3, it can be provided that the bearing surface 20 has a first diameter 24 in the region of a first front end 23 of the slide bearing pad 18. Starting from this first front end 23, the bearing surface 20 can have a diameter increase towards an apex 25.

The bearing surface 20 can have a diameter 26 at the apex 25.

Starting from the apex 25, the bearing surface 20 can have a diameter decrease towards a second front end 27 of the slide bearing pad 18. In the region of the second front end 27, the bearing surface 20 can have a second diameter 28.

In particular, it can be provided that a spherical cap section 29 is configured between the first front end 23 and the apex 25. The spherical cap section 29 can have the basic form of a spherical cap with a spherical cap radius 30.

It can further be provided that the apex 25 is arranged at a distance 33 from a second front end 27 of the slide bearing pad 18. The slide bearing pad 18 can have an axial extension 34.

FIG. 4 shows the first exemplary embodiment of the slide bearing arrangement 9 in a perspective sectional representation, wherein the same reference numbers and/or the same component designations as in the preceding FIGS. 1 to 3 are used again. To avoid unnecessary repetitions, the detailed description in the preceding FIGS. 1 to 3 should be noted and/or is referred to.

As can further be seen from FIG. 4, it can be provided that a cover 36 is arranged on an axial front end 35 of the bearing block 17. The cover 36 serves to close up the interior of the bearing block 17.

As can further be seen from FIG. 4, it can be provided that a lubricating oil reservoir 37 is adjoined to the cover 36, which lubricating oil reservoir 37 serves to receive lubricating oil 38.

In particular, it can be provided here that a pass-through opening 39 is configured in the cover 36, through which the lubricating oil 38 can flow from the lubricating oil reservoir 37 into the interior of the bearing block 17.

FIG. 5 shows a perspective sectional representation of the slide bearing arrangement 9, wherein the same reference numbers and/or the same component designations as in the preceding FIGS. 1 to 4 are used again. To avoid unnecessary repetitions, the detailed description in the preceding FIGS. 1 to 4 should be noted and/or is referred to.

In FIG. 5, the cover 36 and the lubricating oil reservoir 37 are blanked out for better clarity. Therefore, the interior components of the slide bearing 9 are visible.

As can be seen from FIG. 5, it can be provided that a removal opening 41 is configured in the outer ring element 14, which removal opening 41 serves to axially remove individual of the slide bearing pads 18.

FIG. 6 shows a perspective view of the outer ring element 14, wherein the same reference numbers and/or the same component designations as in the preceding FIGS. 1 to 5 are used again. To avoid unnecessary repetitions, the detailed description in the preceding FIGS. 1 to 5 should be noted and/or is referred to.

In FIG. 6, the removal opening 41 is visible particularly clearly.

As can be seen from FIGS. 5 and 6, it can be provided that the removal opening 41 interrupts, at least in sections, the mating surface 21 configured in the outer ring element 14. In particular, it can be provided that the removal opening 41 extends starting from a first front end 42 of the outer ring element 14. In particular, it can be provided that the removal opening 41 does not extend up to a second front end 43 of the outer ring element 14. Rather, the removal opening 41 may extend only up to the apex 25.

As can be seen particularly readily from a combination of FIGS. 3 and 6, it can be provided that the removal opening 41 is configured so as to widen radially towards the first front end 42. In particular, it can be provided here that a first removal opening region 45 and a second removal opening region 46 are configured, each of which have a different radial widening. It can further be provided that the second removal opening region 46, which is arranged closer to the first front end 42 of the outer ring element 14, has a larger radial widening than the first removal opening region 45.

In another exemplary embodiment, which is not represented, it can also be provided, of course, that the removal opening 41 completely penetrates the outer ring element 14 radially.

FIG. 7 shows the rotor shaft 16 with the slide bearing pads 18 arranged thereupon in a perspective view, wherein the same reference numbers and/or the same component designations as in the preceding FIGS. 1 to 6 are used again. To avoid unnecessary repetitions, the detailed description in the preceding FIGS. 1 to 6 should be noted and/or is referred to.

As can be seen from a combination of FIGS. 6 and 7, it can be provided that the removal opening 41 has a circumferential extension 47. The individual slide bearing pads 18 can have a circumferential extension 48.

As can be seen particularly readily from FIG. 5, it can be provided that a shaft nut 49 is configured, which can be screwed onto the rotor shaft 16. On the shaft nut 49, an axial securing element reception 50 can be configured, which serves to receive individual axial securing elements 51. In particular, it can be provided that the axial securing element reception 50 comprises a tapped hole, wherein the individual axial securing elements 51 can be screwed into the tapped hole in a radial direction by means of a fastening screw 52.

It can further be provided that the axial securing elements 51 have a wedge surface 54 on an axial front end 53. On the first front end 23 of the slide bearing pad 18, a first mating wedge surface 55 can be configured. In particular, it can be provided that the wedge surface 54 interacts with and/or rests against the first mating wedge surface 55.

As can further be seen from FIG. 5, it can be provided that an axial stop ring 56 is configured, which, together with the axial securing element 51, serves to clamp the slide bearing pad 18.

In particular, the individual slide bearing pads 18 can be clamped between the axial stop ring 56 and the axial securing element 51 and/or between multiple axial securing elements 51.

As can be seen from FIG. 5, it can be provided that the axial stop ring 56 has a wedge surface 57, which is configured such that an interlocking bond between the slide bearing pad 18 and the axial stop ring 56 can be achieved.

As can further be seen from FIG. 5, it can be provided that the bearing block 17 has an axial stop 62 for the outer ring element 14. It can further be provided that a recess 63 is configured in the axial stop 62, which recess 63 corresponds with the removal opening 41.

In the assembled state of the slide bearing arrangement 9, the outer ring element 14 is received in the bearing block 17.

The axial stop ring 56 can be affixed to the rotor shaft 16. Further, the shaft nut 49 can be screwed onto the rotor shaft 16. As can be seen from FIG. 5, individual slide bearing pads 18 can be clamped between the axial stop ring 56 and at least one axial securing element 51 each. Due to the shape of the axial stop ring 56 and/or of the axial securing element 51, the slide bearing pads 18 can be coupled with the rotor shaft 16 so as to be clamped in an interlocking manner both in an axial direction and in a radial direction.

To change the individual slide bearing pads 18, the cover 36 can be removed from the bearing block 17. Alternatively, it is also conceivable that a maintenance opening is configured in the cover 36, which maintenance opening can be uncoupled from the cover 36, whereby the interior of the bearing block 17 is accessible.

In another alternative, it is also conceivable that the cover 36 is configured so as to be divided, so that it can be removed radially from the rotor shaft 16 and need not be displaced along the rotor shaft 16 in an axial direction. Here, the cover 36 can be configured so as to be divided in a center plane, for example.

FIGS. 8 to 11 show another, third embodiment of the slide bearing arrangement 9 that is optionally independent in itself, wherein the same reference numbers and/or the same component designations as in the preceding FIGS. 1 to 9 are used again. To avoid unnecessary repetitions, the detailed description in the preceding FIGS. 1 to 9 should be noted and/or is referred to.

As can be seen from FIG. 9, it can be provided that the rotor shaft 16 has a rotor shaft flange 71, which can serve to flange the rotor hub 6.

As can be seen from FIG. 10, it can be provided that spacers 73 are configured on the individual slide bearing pads 18. The spacers 73 serve to correctly space the individual slide bearing pads 18 in relation to one another in a circumferential direction. In particular, it can be provided that, on at least one of the circumferential faces 74 of the slide bearing pad 18, the spacers 73 are configured exclusively in the region of the inner face 72 and do not extend across the complete height of the slide bearing pads 18. It can further be provided that the spacers 73 are configured on both circumferential faces 74 of the slide bearing pad 18.

As can be seen particularly readily from FIG. 11, it can be provided that a filler element 80 is configured, which serves to be inserted in the removal opening 41 of the outer ring element 14. In the inserted state, the filler element 80 can complete, or at least partially complete, the mating surface 21. This results in improved sliding properties.

It can further be provided that the filler element 80 can be coupled with the outer ring element 14 by means of an interlocking bond 81, in particular by means of a connecting groove. It can further be provided that the filler element 80 is secured in its position by means of a securing element, which is not represented.

FIGS. 12 to 14 show a detailed view of the slide bearing pad 18 from the third exemplary embodiment of the slide bearing arrangement 9 in different perspective representations, wherein the same reference numbers and/or the same component designations as in the preceding FIGS. 1 to 11 are used again. To avoid unnecessary repetitions, the detailed description in the preceding FIGS. 1 to 11 should be noted and/or is referred to.

As can be seen particularly readily from FIG. 14, it can be provided that a reception 70 for producing an interlocking bond with a lifting device is configured on the inner face 72 of the slide bearing pad 18.

As can be seen from FIG. 14, it can be provided that a form element 69, in particular a tapped hole, is configured on the first front end 23 of the slide bearing pad 18, which form element 69 serves to receive a connection element. By means of the form element 69, the slide bearing pad 18 can be coupled with a slide bearing pad changing device 83.

Further, it can be provided that a recess 82 is configured in the region of the form element 69, which recess 82, in interaction with the form element 69, serves to couple the slide bearing pad 18 with the slide bearing pad changing device 83.

FIG. 15 and FIG. 16 show, in a perspective representation, a first exemplary embodiment of the slide bearing pad changing device 83, which is arranged on the rotor shaft 16 in its change position, wherein the same reference numbers and/or the same component designations as in the preceding FIGS. 1 to 14 are used again. To avoid unnecessary repetitions, the detailed description in the preceding FIGS. 1 to 14 should be noted and/or is referred to.

As can be seen from FIG. 15, it can be provided that the slide bearing pad changing device 83 has a base frame 84, which can have a shaft support surface 85. In particular, it can be provided that the base frame 84 is placed on the rotor shaft 16 on its shaft support surface 85. It can further be provided that recesses are configured in the base frame 84, through which recesses a fastening element 86, in particular a tensioning strap, can be guided in order to affix the base frame 84 to the rotor shaft 16.

It can further be provided that a linear guide 87 is arranged on the base frame 84, in which linear guide 87 a guide carriage 88 is guided so as to be longitudinally displaceable. In particular, it can be provided that the guide carriage 88 has a recirculating ball bearing guide, by means of which it is guided in the linear guide 87.

It can further be provided that the linear guide 87 is arranged at an angle 89 to the shaft support surface 85. The angle 89 can be between 0.1° and 45°, in particular between 1° and 30°, preferably between 5° and 15°.

It can further be provided that a lifting device 90 is configured on the guide carriage 88, which lifting device 90 has a lifting carriage 91. The lifting carriage 91 can be configured so as to be displaceable relative to the guide carriage 88 by means of a lifting guide 92. Further, a lifting spindle 93 can be configured, by means of which the lifting carriage 91 is displaceable. In particular, it can be provided that the lifting spindle 93 can be coupled with a cordless screwdriver and can be driven by same.

As can be seen particularly readily from FIG. 16, it can be provided that a manipulation arm 94 is coupled with the lifting carriage 91. In particular, it can be provided that the manipulation arm 94 has a first manipulation arm part 95 and a second manipulation arm part 96. The first manipulation arm part 95 can be configured for coupling with the slide bearing pad 18. In particular, it can be provided that the first manipulation arm part 95 and the second manipulation arm part 96 are coupled with each other by means of a first rotational joint 97. It can further be provided that the second manipulation arm part 96 is coupled with the lifting carriage 91 of the lifting device 90 by means of a second rotational joint 98. It can further be provided that a first rotary limiter 99 is configured in the region of the first rotational joint 97, which first rotary limiter 99 serves to limit a rotational angle between the first manipulation arm part and the second manipulation arm part 96. It can further be provided that a second rotary limiter 100 is configured in the region of the second rotational joint 98, which second rotary limiter 100 serves to limit the rotational angle between the second manipulation arm part 96 and the lifting carriage 91.

As can further be seen from FIG. 16, it can be provided that the slide bearing pad 18 is coupled with the first manipulation arm part 95 of the manipulation arm 94 by means of a connection element 101. The connection element 101 can be configured in the form of a fastening screw, for example. It can further be provided that the first manipulation arm part 95 is adapted to the shape of the recess 82 of the slide bearing pad 18, so that an interlocking bond between the slide bearing pad 18 and the first manipulation arm part 95 can be produced.

As can further be seen from FIG. 15, it can be provided that an adjusting spindle 102 is configured, by means of which the guide carriage 88 is displaceable on the linear guide 87. It can further be provided that the adjusting spindle 102 is coupled with a shaft journal, wherein the shaft journal is configured such that it can be coupled with a cordless screwdriver.

In FIGS. 17 and 18, a second exemplary embodiment of the slide bearing pad changing device 83 is represented, wherein the same reference numbers and/or the same component designations as in the preceding FIGS. 1 to 16 are used again. To avoid unnecessary repetitions, the detailed description in the preceding FIGS. 1 to 16 should be noted and/or is referred to.

As can be seen from FIGS. 17 and 18, it can be provided that the slide bearing pad changing device 83 comprises a first roller conveyor 103 and a second roller conveyor 104, wherein multiple bearing rollers 105 are arranged on each roller conveyor 103, 104. It can further be provided that a rest recess 108 is configured and/or two rest recesses 108 are configured on the slide bearing pad 18, each of which serve to rest on the bearing rollers 105 of the first roller conveyor 103 and of the second roller conveyor 104.

As can be seen particularly readily from FIG. 18, it can be provided that the first roller conveyor 103 and the second roller conveyor 104 are arranged at a mutual distance 106, so that the slide bearing pad 18 can rest stably on the first roller conveyor 103 and on the second roller conveyor 104.

As can further be seen from FIGS. 17 and 18, a manipulation arm 94 can be provided also in this exemplary embodiment, which manipulation arm 94 has a first manipulation arm part 95 and a second manipulation arm part 96, wherein the first manipulation arm part 95 is configured for coupling with the slide bearing pad 18. The second manipulation arm part 96 can be coupled with the guide carriage 88.

As can further be seen from FIG. 18, it can be provided that the first roller conveyor 103 and the second roller conveyor 104 are cranked downward at a frontal end 107. Here, in particular, the bearing rollers 105 can be arranged in one plane in a main part of the first roller conveyor 103 and of the second roller conveyor 104 and be arranged in another plane in the region of the frontal end 107, which other plane is configured so as to be tilted angularly relative to the first plane.

It can further be provided that a recess 109 is configured in the region of the frontal end 107, which recess 109 can correspond with the shape of the shaft nut 49, so that the first roller conveyor 103 and the second roller conveyor 104 can be placed over the shaft nut 49 such that the slide bearing pad 18 to be changed can be pulled directly out of its seat in the slide bearing arrangement 9.

The operation of changing individual slide bearing pads 18 is described below, wherein the actual changing operations by means of the first exemplary embodiment of the slide bearing pad changing device 83 and by means of the second exemplary embodiment of the slide bearing pad changing device 83 are described separately. The preparatory work for changing individual slide bearing pads 18 is identical for both exemplary embodiments and is therefore described jointly.

To expose the slide bearing pads 18, the cover 36 can be demounted and/or a recess in the cover 36 can be opened, so that the slide bearing pads 18 are axially accessible. Subsequently, the respective slide bearing pad 18 to be changed can be twisted into in the region of the removal opening 41. Subsequently, the axial securing element 51 of the slide bearing pad 18 to be changed can be released and removed. This ensures that the slide bearing pad 18 to be changed is no longer clamped on the rotor shaft 16.

In another method step, the slide bearing pad 18 to be changed can be displaced axially and/or optionally simultaneously also radially outward through the removal opening 41 in order to remove the slide bearing pad 18 from the inside of the bearing block 17. In another method step, a new slide bearing pad 18 can be inserted again into the inside of the bearing block 17 and/or be clamped with the axial securing element 51 in reverse sequence. This operation can be repeated for all slide bearing pads 18 to be changed.

Subsequently, the inside of the bearing block 17 can be closed up again by means of the cover 36 and thus the slide bearing arrangement 9 can be made operational again.

During the actual changing operation of the slide bearing pads 18 with the first exemplary embodiment of the slide bearing pad changing device 83, the slide bearing pad changing device 83 can be placed in its position provided for this purpose and be affixed to the rotor shaft 16 and/or to the shaft nut 49. Subsequently, the first manipulation arm part 95 can be coupled with the slide bearing pad 18 to be changed by means of the connection element 101.

Subsequently, the guide carriage 88 can be moved in an axial direction along the linear guide 87, so that the slide bearing pad can be axially pulled out of its position.

Subsequently and/or in parallel, the lifting carriage 91 can be lifted, so that the slide bearing pad 18 can be lifted over the shaft nut 49. Subsequently, the guide carriage 88 can be axially displaced further, so that the slide bearing pad 18 can be removed completely from the slide bearing arrangement 9.

When lifting the slide bearing pad 18, it can be achieved with the first rotary limiter 99 and/or with the second rotary limiter 100 that, despite an eccentric reception of the slide bearing pad and therefore the application of a tilting moment, the slide bearing pad 18 can be lifted completely in an approximately horizontal and/or slightly tilted alignment.

With a slide bearing pad changing device 83 in accordance with the second exemplary embodiment, the slide bearing pad change is done as follows. The first manipulation arm part 95 is coupled with the slide bearing pad 18 to be changed. Subsequently, by displacing the guide carriage 88 on the linear guide 87, the slide bearing pad 18 to be changed is pulled out of its position in an axial direction.

Here, the rest recess 108 on the bearing rollers 105 will first come to a rest in the region of the frontal end 107 of the first roller conveyor 103 and/or of the second roller conveyor 104. Subsequently, the slide bearing pad 18 slides out of its slide bearing position on the bearing rollers 105 due to a further pulling movement by means of the manipulation arm 94 and/or by means of the guide carriage 88.

For both embodiment variants of the slide bearing pad changing device 83, the inserting of a new slide bearing pad is done in reverse sequence.

FIGS. 19 and 20 show another, fourth embodiment of the slide bearing arrangement 9 that is optionally independent in itself, wherein the same reference numbers and/or the same component designations as in the preceding FIGS. 1 to 16 are used again. To avoid unnecessary repetitions, the detailed description in the preceding FIGS. 1 to 18 should be noted and/or is referred to.

For the sake of simplicity, only a single slide bearing pad 18 is represented in FIGS. 19 and 20, wherein, however, also multiple of the slide bearing pads 18 can be arranged so as to be distributed evenly across the circumference, just like in the preceding exemplary embodiments.

As can be seen from FIG. 20, it can be provided that a slide bearing pad reception ring 110 is arranged on the inner ring element 13, which slide bearing pad reception ring 110 serves to receive the individual slide bearing pads 18.

In particular, it can be provided that the individual slide bearing pads 18 have a shoulder 114 on their inner face 72. The shoulder 114 can form a contact surface, so that the slide bearing pad 18 can rest against a first front end 115 of the slide bearing pad reception ring 110 in the region of the shoulder 114. This ensures that the slide bearing pad 18 can be positioned relative to the slide bearing pad reception ring 110 in an axial direction.

It can further be provided that the shoulder 114 bounds a recess 116, which is configured on the inner face 72 of the slide bearing pad 18. The recess 116 can extend up to the shoulder 114 starting from the second front end 27 of the slide bearing pad 18. The recess 116 and/or the shoulder 114 can be configured so as to be rotationally symmetric.

In particular, it can be provided that, in the integrated state of the slide bearing pad 18, the slide bearing pad reception ring 110 is at least partially received in the recess 116 of the slide bearing pad 18.

It can further be provided that multiple tapped holes 111 are configured on the first front end 115 of the slide bearing pad reception ring 110. Corresponding with the tapped holes 111, one, in particular multiple, pass-through holes 112 can be configured in each of the slide bearing pads 18.

Further, fastening screws 113 can be guided through the pass-through holes 112, which fastening screws 113 can be screwed into the tapped holes 111 and can therefore serve to affix the slide bearing pads 18 to the slide bearing pad reception ring 110.

As can further be seen from FIG. 20, it can be provided that a second front end 117 of the slide bearing pad reception ring 110 rests against a shaft bead 118. This enables the slide bearing pad reception ring 110 to be positioned axially on the inner ring element 13.

In the exemplary embodiment according to FIG. 19 and FIG. 20, instead of the releasing of the axial securing element 51 of the slide bearing pad 18 to be changed, the following method steps can be carried out.

The individual fastening screws 113 of the slide bearing pad to be changed can be released and removed. This ensures that the slide bearing pad 18 to be changed is no longer clamped on the slide bearing pad reception ring 110.

In another method step, the slide bearing pad 18 to be changed can be displaced axially and/or optionally simultaneously also radially outward through the removal opening 41 in order to remove the slide bearing pad 18 from the inside of the bearing block 17. In another method step, a new slide bearing pad 18 can be inserted again into the inside of the bearing block 17 and/or be affixed to the slide bearing pad reception ring 110 with the fastening screws 113 in reverse sequence. This operation can be repeated for all slide bearing pads 18 to be changed.

In FIG. 21, a third exemplary embodiment of the slide bearing pad changing device 83 is represented, wherein the same reference numbers and/or the same component designations as in the preceding FIGS. 1 to 20 are used again. To avoid unnecessary repetitions, the detailed description in the preceding FIGS. 1 to 20 should be noted and/or is referred to.

The third exemplary embodiment of the slide bearing pad changing device 83 can in particular be used for changing slide bearing pads 18 in a slide bearing pad arrangement such as it is provided in FIGS. 19 and 20.

As can be seen from FIG. 21, it can be provided that the slide bearing pad changing device 83 has a base frame 84, which is configured for coupling with the bearing block 17. In particular, it can be provided that the base frame 84 can be screwed into tapped holes of the bearing block 17 by means of fastening screws. The tapped holes in the bearing block 17 can serve to receive and/or to affix a bearing cover, for example.

It can further be provided that a linear guide 87 in the form of guide bars is affixed to the base frame 84 and that the guide carriage 88 is guided on the guide bars. It can further be provided that the adjusting spindle 102 is configured for displacing the guide carriage 88 relative to the base frame 84 and is coupled with a handwheel 119 for initiating a rotational movement.

As can further be seen from FIG. 21, it can be provided that the manipulation arm 94 is coupled with the guide carriage 88 by means of manipulation arm fastening means 121, in particular by means of screws. It can further be provided that a radial adjustment unit 120 is configured between the guide carriage 88 and the manipulation arm 94, which radial adjustment unit 120 serves to displace the manipulation arm 94 relative to the guide carriage 88 in a radial direction. The radial adjustment unit 120 can have an adjusting screw, for example, which is coupled with the manipulation arm 94. For adjustability of the manipulation arm 94 relative to the guide carriage 88, it can be provided that the manipulation arm fastening means 121 are guided in an elongated hole guide.

As can further be seen from FIG. 21, it can be provided that the manipulation arm 94 has a first manipulation arm part 95 and a second manipulation arm part 96, wherein the first manipulation arm part 95 is configured for coupling with the slide bearing pad 18.

In particular, it can be provided that a guide groove 122 is configured between the first manipulation arm part 95 and the second manipulation arm part 96. Here, it can be provided that the first manipulation arm part 95 is guided in a guide groove 122 of the second manipulation arm part 96, wherein the first manipulation arm part 95 and the second manipulation arm part 96 can be displaceable relative to each other. The first manipulation arm part 95 and the second manipulation arm part 96 can be coupled with each other by means of a manipulation arm part fastening means 123.

As can be seen from FIG. 21, the manipulation arm part fastening means 123 can be configured in the form of a screw. It can further be provided that a circumference adjustment unit 124 is configured, by means of which the first manipulation arm part 95 can be displaced relative to the second manipulation arm part 96 in a circumferential direction. Here, the manipulation arm part fastening means 123 can be received in an elongated hole reception in the second manipulation arm part 96. The circumference adjustment unit 124 can equally comprise an adjusting screw.

FIG. 22 shows a first exemplary embodiment of a lifting arm 125 for removing the slide bearing pad 18 from the slide bearing pad changing device 83 and/or for inserting a new slide bearing pad 18 in the slide bearing pad changing device 83. As can be seen from FIG. 22, it can be provided that the lifting arm 125 is affixed to a circumferential face 74 of the slide bearing pad 18 by means of a fastening screw 126. The lifting arm 125 can have a lifting reception 127, on which the lifting arm 125 can be coupled with a lifting means, such as a crane, for example.

It can further be provided that the lifting reception 127 is adjustable relative to the lifting arm fastening screw 126, so that the lifting arm 125 can be configured such that the lifting reception 127 runs through the center of mass of the lifting arm 125 together with the slide bearing pad 18 when the slide bearing pad 18 is aligned horizontally.

The exemplary embodiments show possible embodiment variants, wherein it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

Any and all specifications of value ranges in the description at issue are to be understood to comprise any and all sub-ranges of same, for example the specification 1 to 10 is to be understood to mean that any and all sub-ranges starting from the lower limit 1 and from the upper limit 10 are comprised therein, i.e. any and all sub-ranges start at a lower limit of 1 or larger and end at on upper limit of 10 or less, e.g. 1 to 1.7, or 3.2 to 8.1, or 5.5 to 10.

Finally, as a matter of form, it should be noted that for ease of understanding of the structure, elements are partially not depicted to scale and/or are enlarged and/or are reduced in size.

| List of reference numbers | |
|---|---|
| 1 | wind turbine |
| 2 | nacelle |
| 3 | tower |
| 4 | nacelle housing |
| 5 | rotor |
| 6 | rotor hub |
| 7 | rotor blade |
| 8 | rotor bearing arrangement |
| 9 | slide bearing arrangement |
| 10 | radial force |
| 11 | axial force |
| 12 | tilting moment |
| 13 | inner ring element |
| 14 | outer ring element |
| 15 | slide bearing element |
| 16 | rotor shaft |
| 17 | bearing block |
| 18 | slide bearing pad |
| 19 | axis of rotation |
| 20 | bearing surface |
| 21 | mating surface |
| 22 | inner face |
| 23 | first front end |
| 24 | first diameter |
| 25 | apex |
| 26 | diameter at apex |
| 27 | second front end |
| 28 | second diameter |
| 29 | spherical cap section |
| 30 | spherical cap radius |
| 31 | |
| 32 | |
| 33 | distance |
| 34 | axial extension of slide bearing pad |
| 35 | axial front end of bearing block |
| 36 | cover |
| 37 | lubricating oil reservoir |
| 38 | lubricating oil |
| 39 | pass-through opening |
| 40 | |
| 41 | removal opening |
| 42 | first front end of outer ring element |
| 43 | second front end of outer ring element |
| 44 | |
| 45 | first removal opening region |
| 46 | second removal opening region |
| 47 | circumferential extension of removal opening |
| 48 | circumferential extension of slide bearing pad |
| 49 | shaft nut |
| 50 | axial securing element reception |
| 51 | axial securing element |
| 52 | fastening screw |
| 53 | axial front end of axial securing element |
| 54 | wedge surface of axial securing element |
| 55 | first mating wedge surface |
| 56 | axial stop ring |
| 57 | wedge surface of axial stop ring |
| 58 | |
| 59 | |
| 60 | |
| 61 | |
| 62 | axial stop |
| 63 | recess |
| 64 | |
| 65 | |
| 66 | |
| 67 | |
| 68 | thrust ring segment |
| 69 | form element of slide bearing pad |
| 70 | reception for lifting device |
| 71 | rotor shaft flange |
| 72 | inner face |
| 73 | spacer |
| 74 | circumferential face |
| 75 | lubricating oil transport groove |
| 76 | second mating wedge surface |
| 77 | |
| 78 | |
| 79 | |
| 80 | filler element |
| 81 | interlocking bond |
| 82 | recess |
| 83 | slide bearing pad changing device |
| 84 | base frame |
| 85 | shaft support surface |
| 86 | fastening element |
| 87 | linear guide |
| 88 | guide carriage |
| 89 | angle |
| 90 | lifting device |
| 91 | lifting carriage |
| 92 | lifting guide |
| 93 | lifting spindle |
| 94 | manipulation arm |
| 95 | first manipulation arm part |
| 96 | second manipulation arm part |
| 97 | first rotational joint |
| 98 | second rotational joint |
| 99 | first rotary limiter |
| 100 | second rotary limiter |
| 101 | connection element |
| 102 | adjusting spindle |
| 103 | first roller conveyor |
| 104 | second roller conveyor |
| 105 | bearing roller |
| 106 | distance first roller conveyor - second roller conveyor |
| 107 | frontal end |

-continued

List of reference numbers

| | |
|---|---|
| 108 | rest recess |
| 109 | recess |
| 110 | slide bearing pad reception ring |
| 111 | tapped hole |
| 112 | pass-through hole |
| 113 | fastening screw |
| 114 | shoulder |
| 115 | first front end of slide bearing pad reception ring |
| 116 | recess |
| 117 | second front end of slide bearing pad reception ring |
| 118 | shaft bead |
| 119 | handwheel |
| 120 | radial adjustment unit |
| 121 | manipulation arm fastening means |
| 122 | guide groove |
| 123 | manipulation arm part fastening means |
| 124 | circumference adjustment unit |
| 125 | lifting arm |
| 126 | lifting arm fastening screw |
| 127 | lifting reception |

The invention claimed is:

1. A method for changing slide bearing pads arranged on a rotor shaft of a rotor bearing arrangement of a wind turbine, comprising the method steps:
  moving the slide bearing pad to be changed to a removal opening by rotating the rotor shaft;
  releasing an axial securing element, or releasing fastening screws, of the slide bearing pad to be changed;
  axially removing the slide bearing pad to be changed through the removal opening;
  axially inserting a new slide bearing pad through the removal opening;
  fixing the new slide bearing pad by means of the axial securing element, or by means of the fastening screws, wherein a slide bearing pad changing device with a manipulation arm is used for axially removing the slide bearing pad to be changed and for axially inserting a new slide bearing pad, wherein the manipulation arm is configured for coupling with the slide bearing pad.

2. The method according to claim 1, wherein the manipulation arm is coupled with the slide bearing pad by means of a connection element and wherein a form element that interacts with the connection element is configured on a front end of the slide bearing pad.

3. The method according to claim 1, wherein a base frame is affixed to the rotor shaft by means of a fastening element.

4. The method according to claim 1, wherein a base frame is affixed to a bearing block by means of a fastening means.

5. The method according to claim 1, wherein a lifting arm is used for removing the slide bearing pad from the manipulation arm and for affixing a new slide bearing pad to the manipulation arm, wherein the lifting arm is affixed to a circumferential face of the slide bearing pad such that the manipulation arm and the lifting arm can be affixed to the slide bearing pad simultaneously.

6. The method according to claim 1, wherein the movement of the manipulation arm relative to a base frame of the slide bearing pad changing device is driven by a cordless screwdriver.

* * * * *